United States Patent [19]
Lareau et al.

[11] Patent Number: 5,668,593
[45] Date of Patent: Sep. 16, 1997

[54] METHOD AND CAMERA SYSTEM FOR STEP FRAME RECONNAISSANCE WITH MOTION COMPENSATION

[75] Inventors: Andre G. Lareau, Bloomingdale; Gilbert W. Willey, Arlington Heights; Russell A. Bennett, McHenry; Stephen R. Beran, Mount Prospect, all of Ill.

[73] Assignee: Recon/Optical, Inc., Barrington, Ill.

[21] Appl. No.: 486,989

[22] Filed: Jun. 7, 1995

[51] Int. Cl.⁶ .................................................. H04N 07/18
[52] U.S. Cl. .......................... 348/146; 348/147; 348/148
[58] Field of Search ..................... 348/146, 147, 348/148

[56] References Cited

U.S. PATENT DOCUMENTS

| | | | |
|---|---|---|---|
| 3,981,574 | 9/1976 | Jesensky et al. | |
| 4,080,056 | 3/1978 | Jesensky et al. | |
| 4,527,055 | 7/1985 | Harkless | 348/146 |
| 5,043,924 | 8/1991 | Hofmann | 364/525 |
| 5,138,440 | 8/1992 | Hiramatsu | 348/146 |
| 5,146,073 | 9/1992 | Wirth et al. | 348/146 |
| 5,155,597 | 10/1992 | Lareau et al. | |
| 5,210,586 | 5/1993 | Grage et al. | 356/6 |
| 5,247,356 | 9/1993 | Ciampa | 358/109 |
| 5,251,037 | 10/1993 | Busenberg | 348/146 |
| 5,481,479 | 1/1996 | Wight et al. | 364/525 |

OTHER PUBLICATIONS

"The KS-146A LOROP Camera System", Thomas C. Augustyn, SPIE Proceedings vol. 9, Aug. 27-28 1981, paper 309-11 p. 76.
"KS-127A Long Range Oblique Reconnaissance Camera for RF-4 Aircraft", Richard C. Ruck and Oliver J. Smith, SPIE Proceedings vol. 242, Jul. 29-30, 1980 San Diego paper 242-02, p. 22.
Military Handbook (MIL-HDBK)—141, Mirror and Prism Systems, pp. 13-36 (date unknown).

*Primary Examiner*—Tommy P. Chin
*Assistant Examiner*—Anand Rao
*Attorney, Agent, or Firm*—McDonnell Boehnen Hulbert & Berghoff

[57] ABSTRACT

An electro-optical step-frame camera system in which successive overlapping frames of scene imagery are generated by an electro-optical imaging array, and in which electronic image motion compensation is performed by the array during the generation of at least some of the frames of imagery. The successive frames of imagery are made in a stepping pattern that is repeated in a series of cycles of steps, each step separated by a framing interval in which a frame of imagery is obtained. The stepping cycles of the camera generate sweeping coverage of the terrain of interest. As the velocity to height ratio of the reconnaissance aircraft changes, the stepping cycle and electronic image motion compensation are continually adjusted, so as to ensure maximum scene coverage and preservation of image resolution.

22 Claims, 20 Drawing Sheets

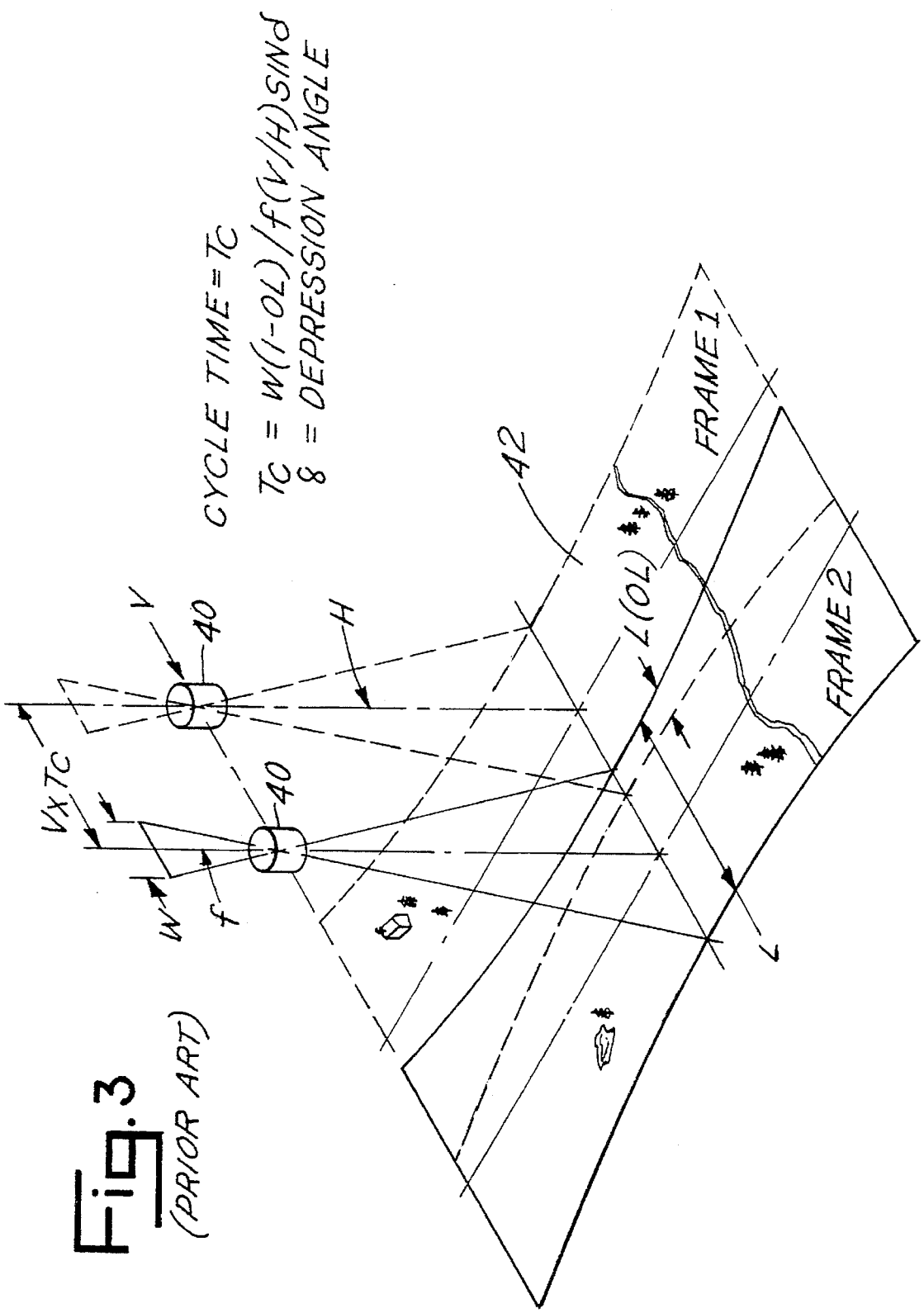

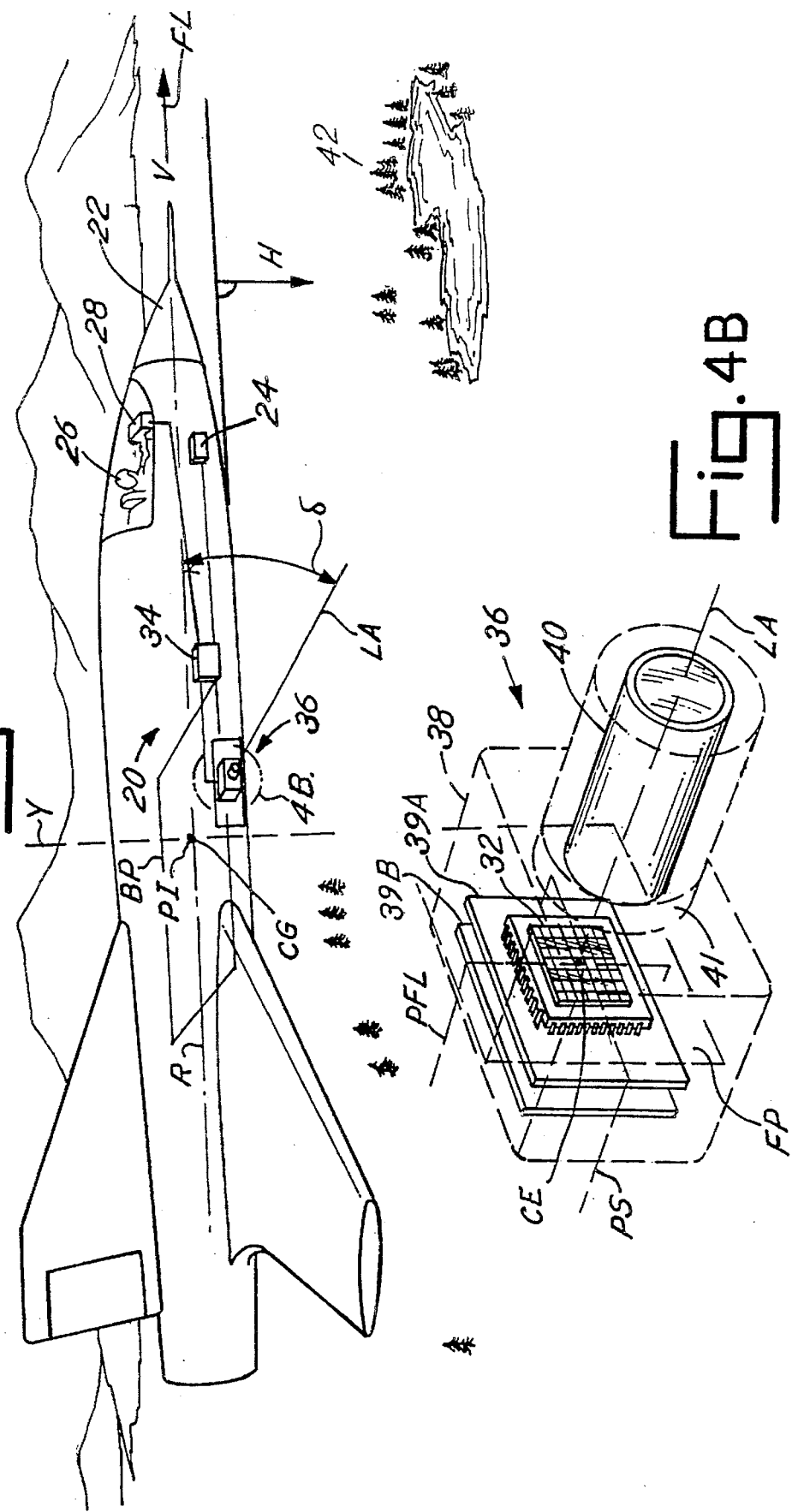

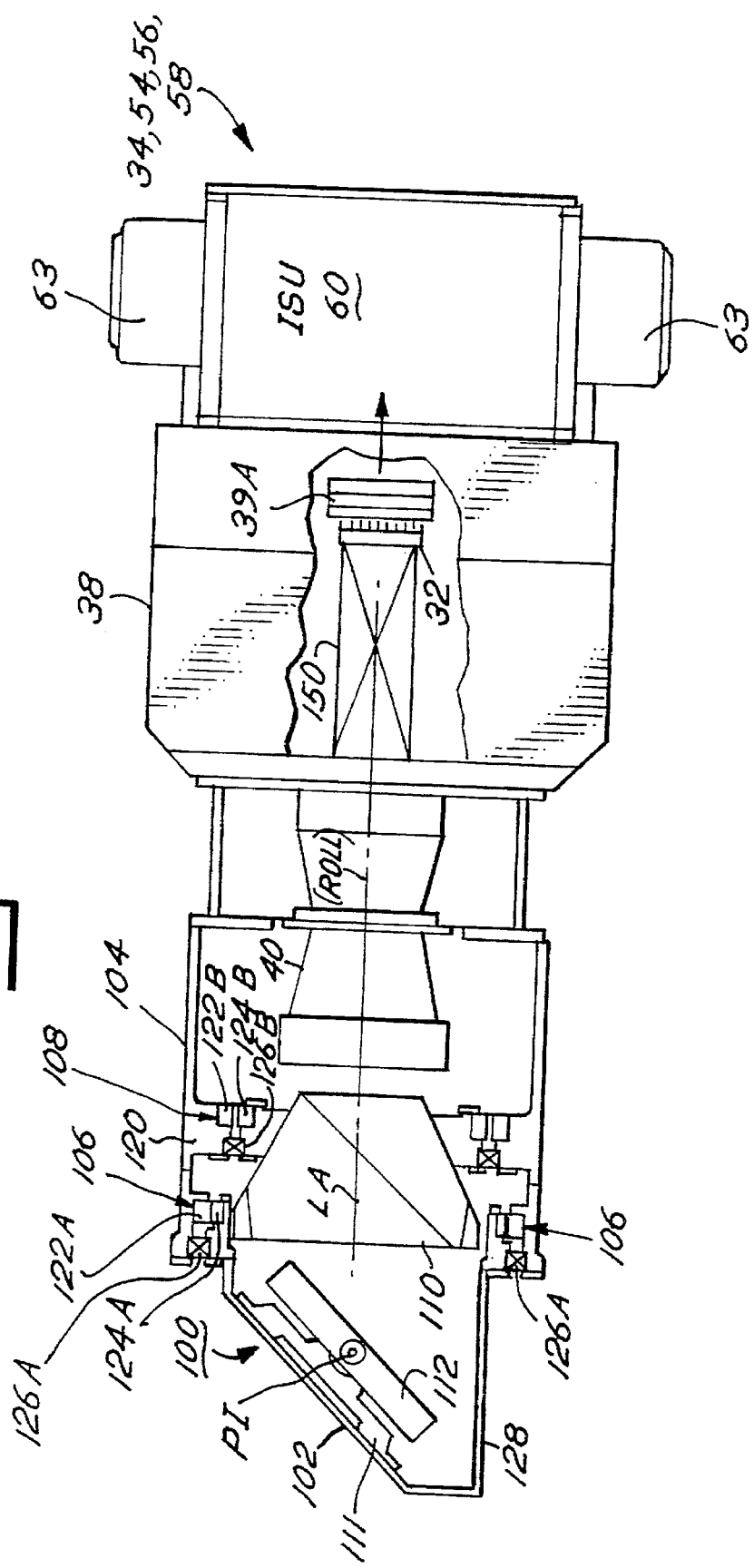

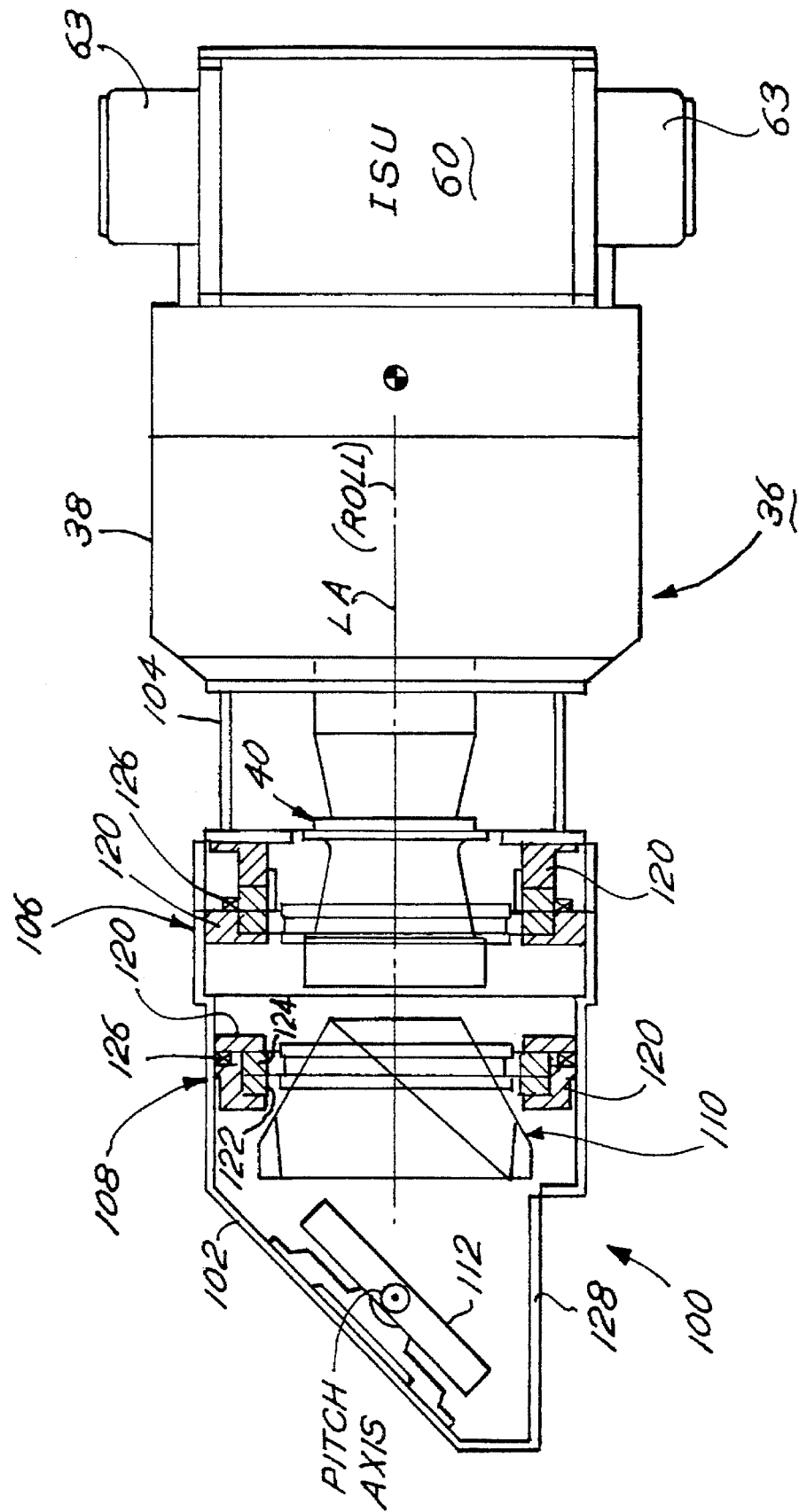

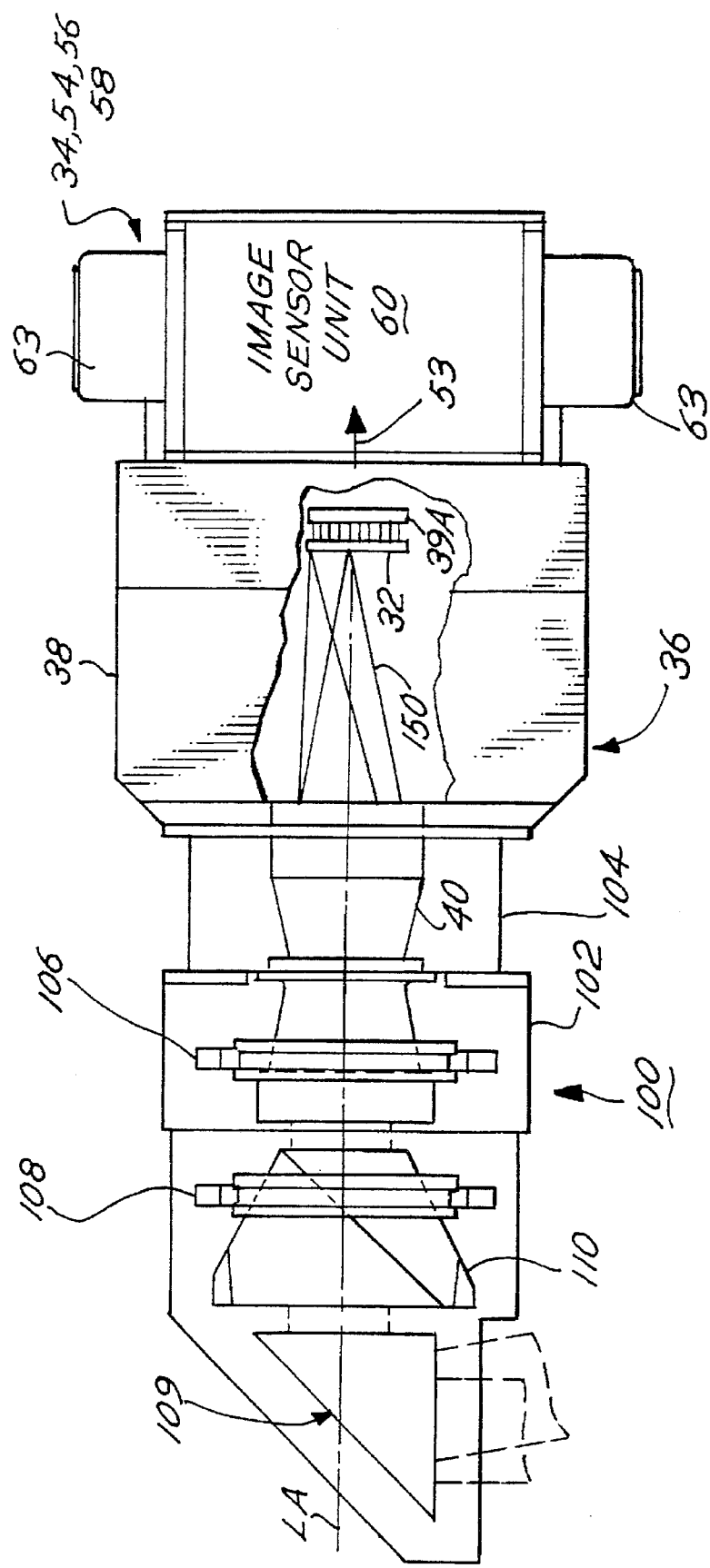

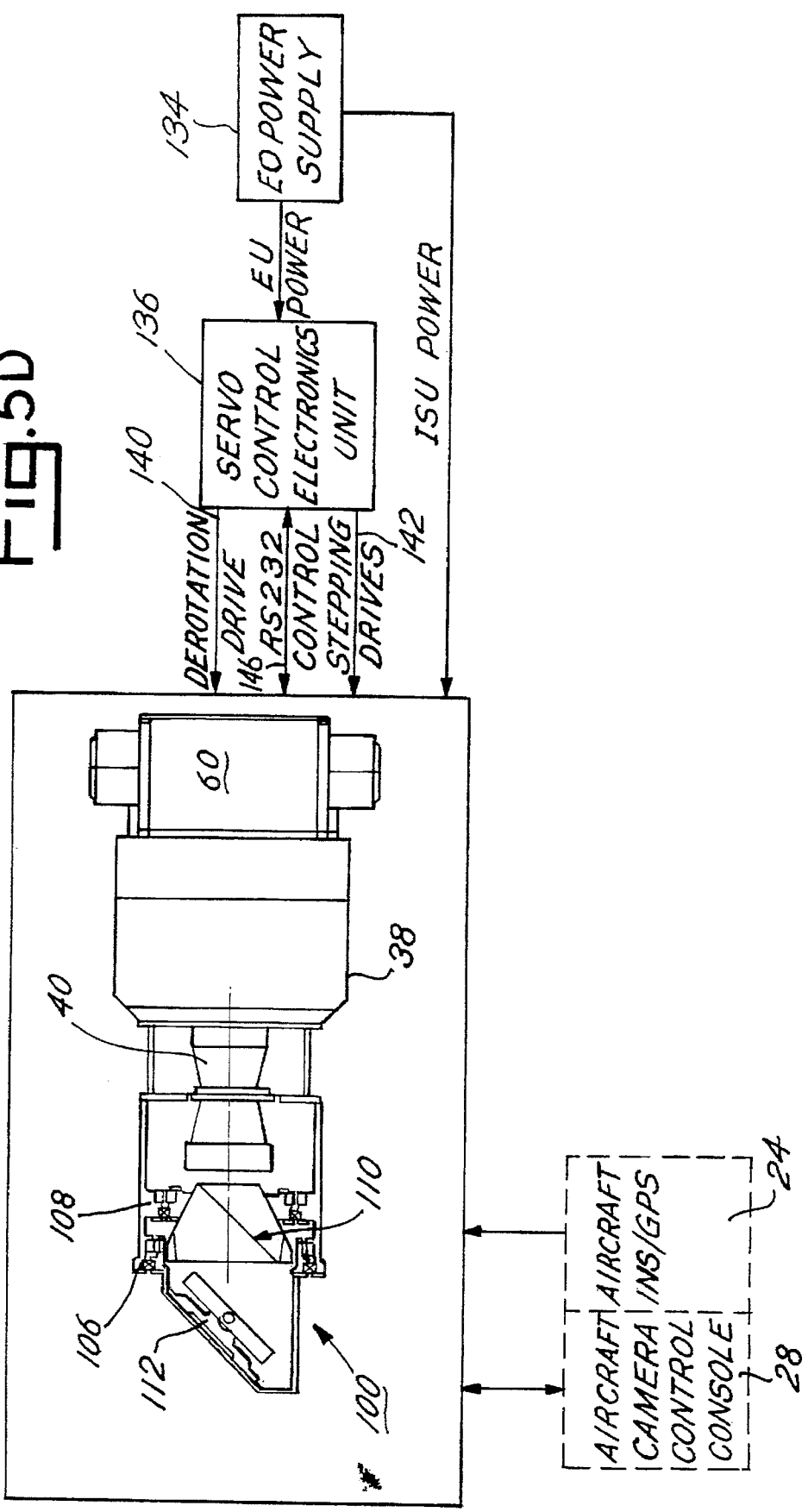

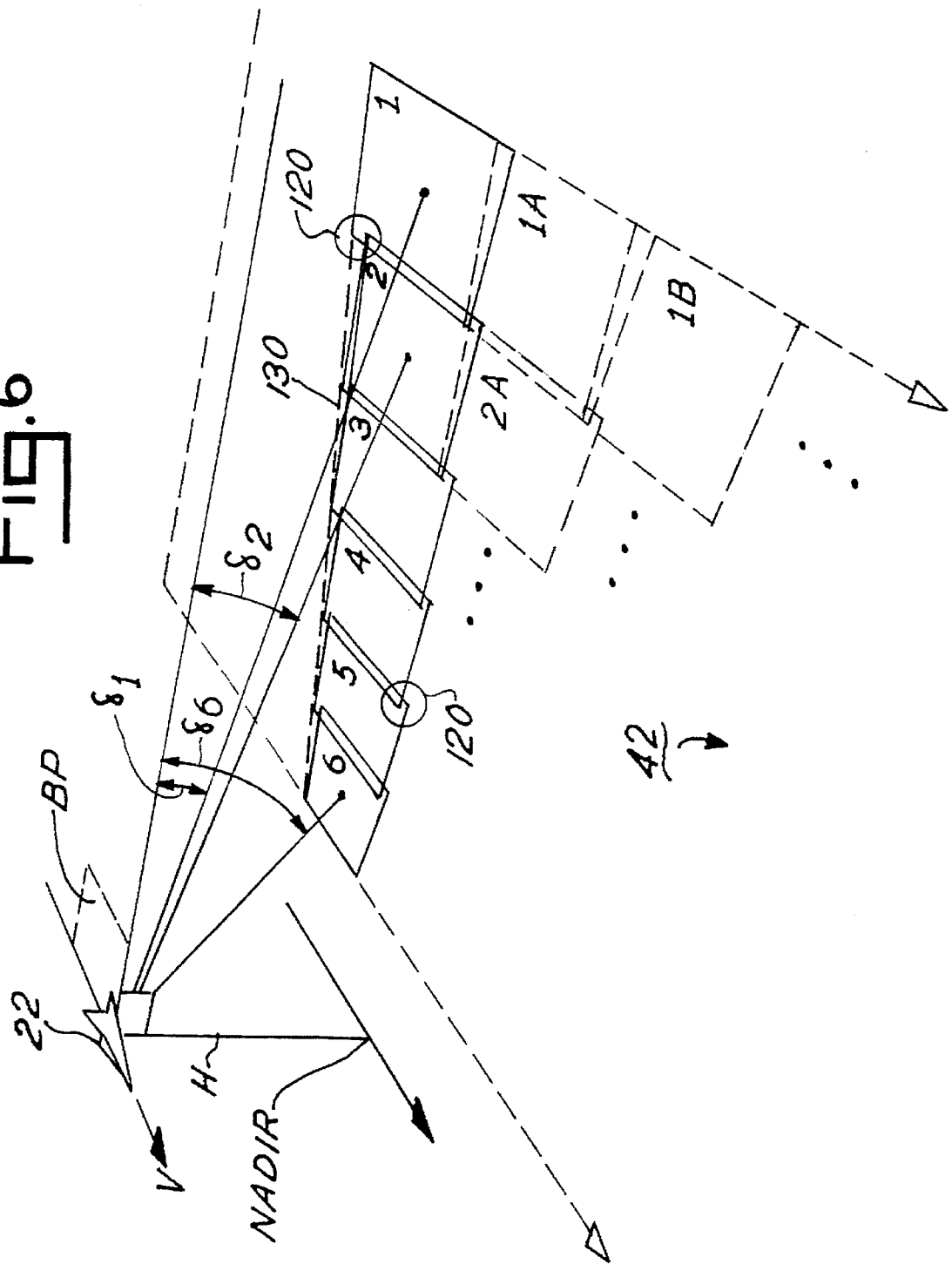

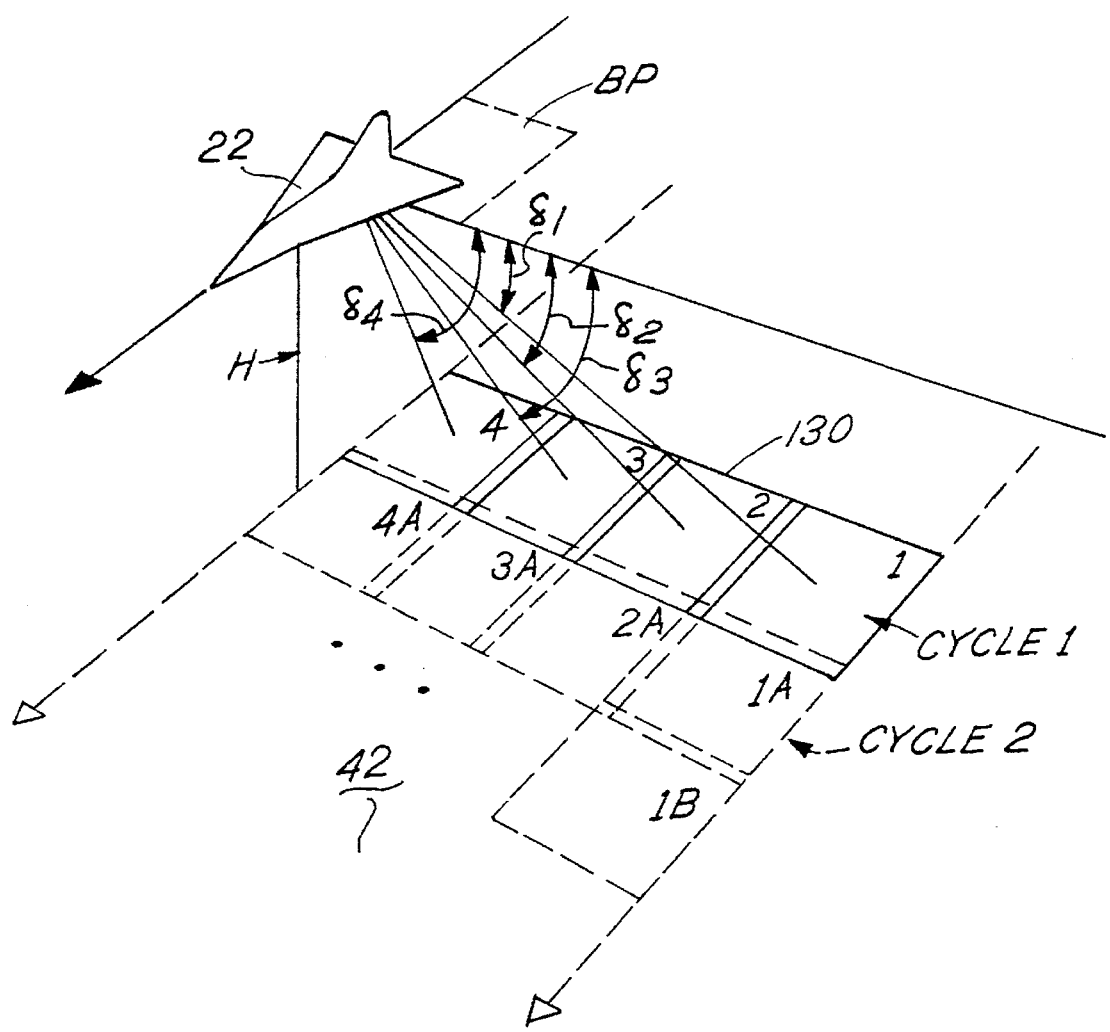

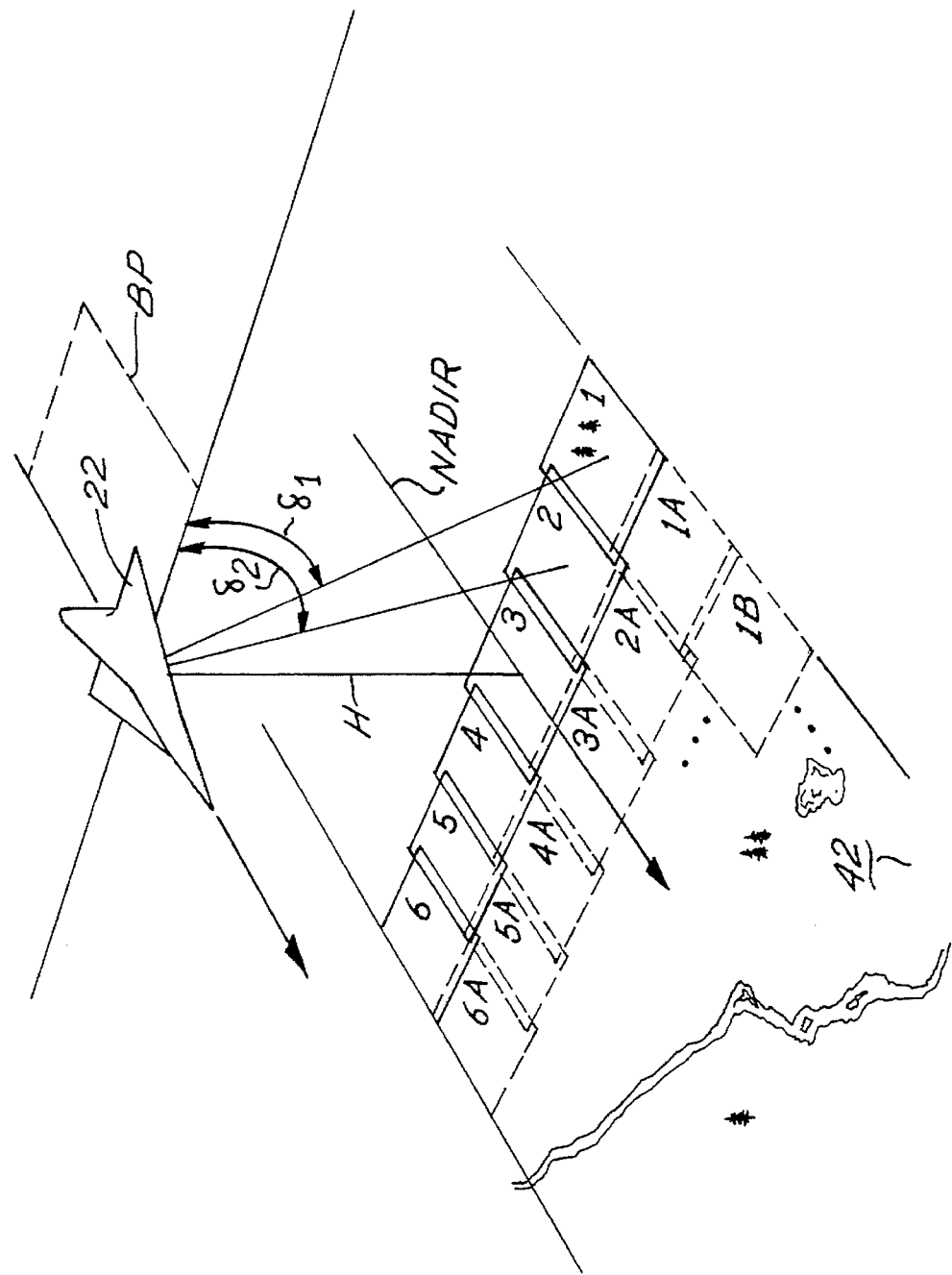

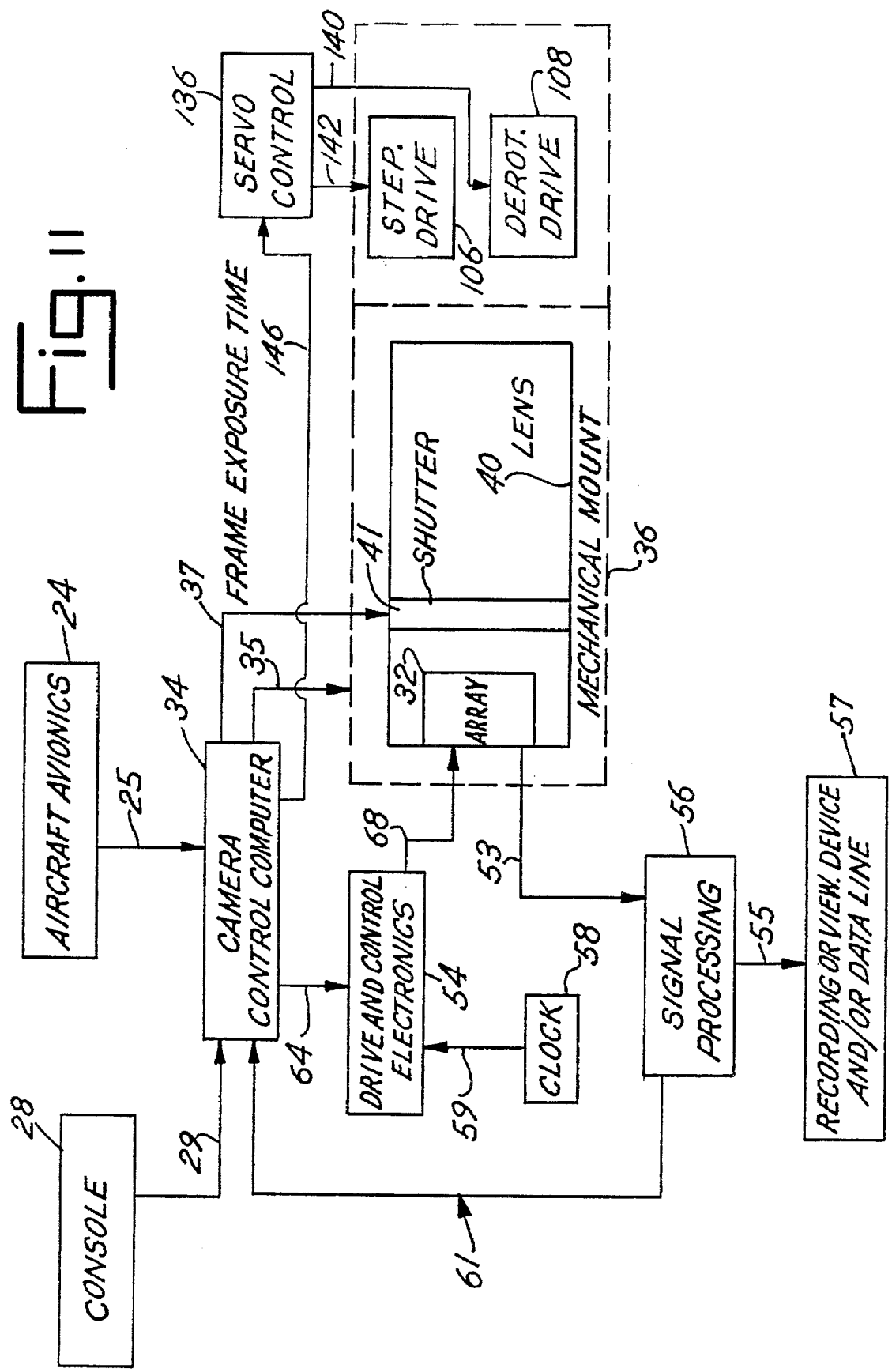

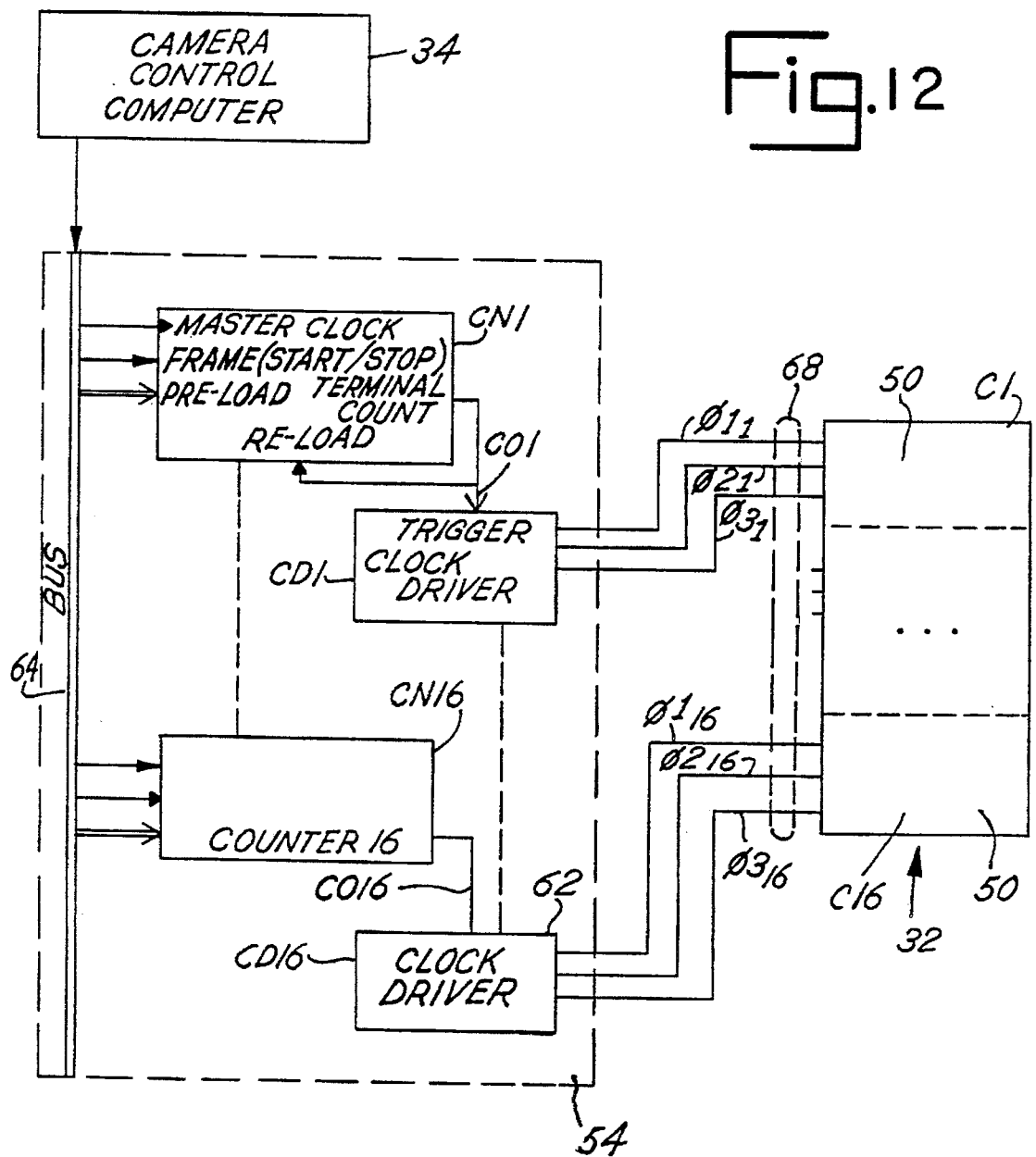

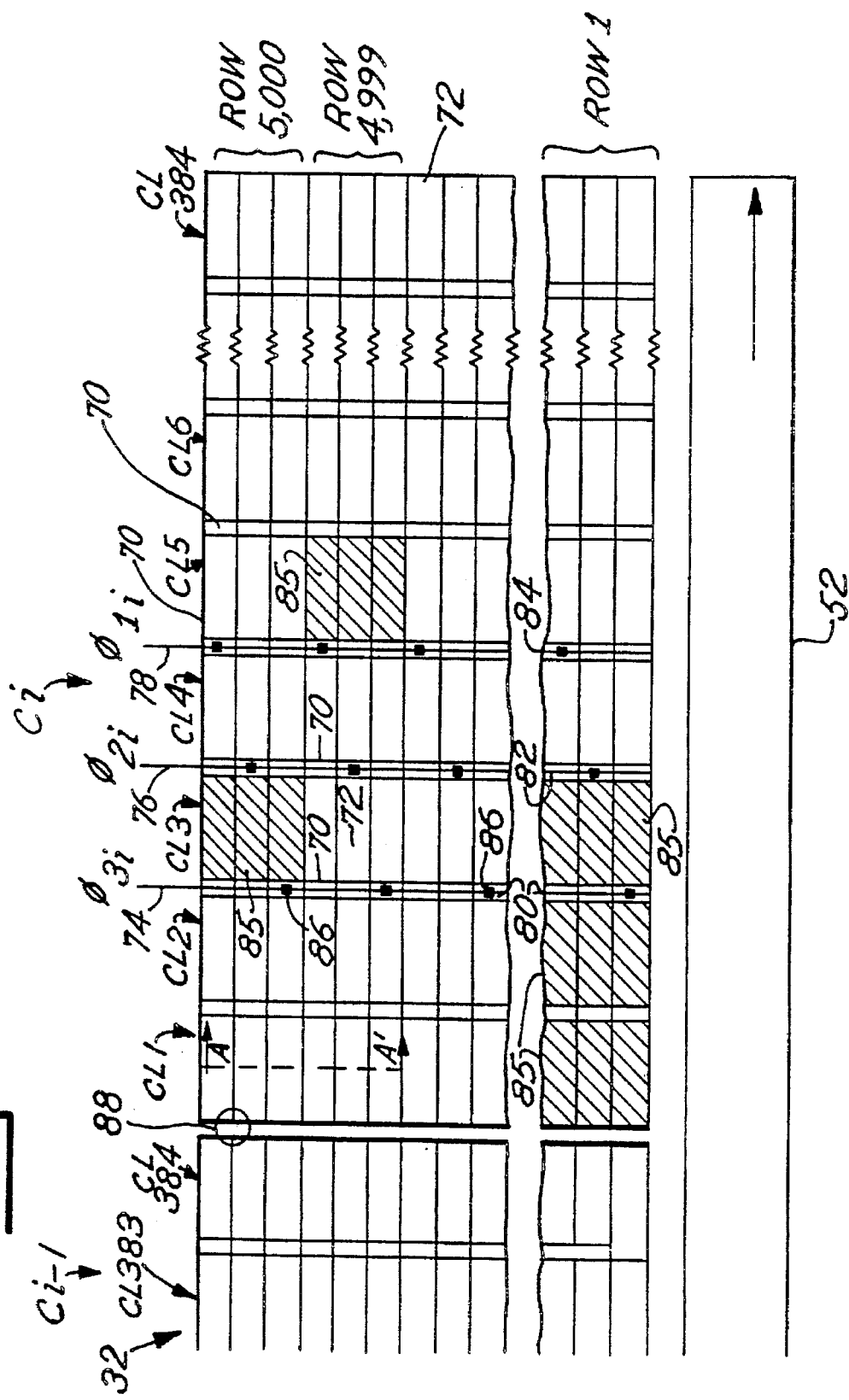

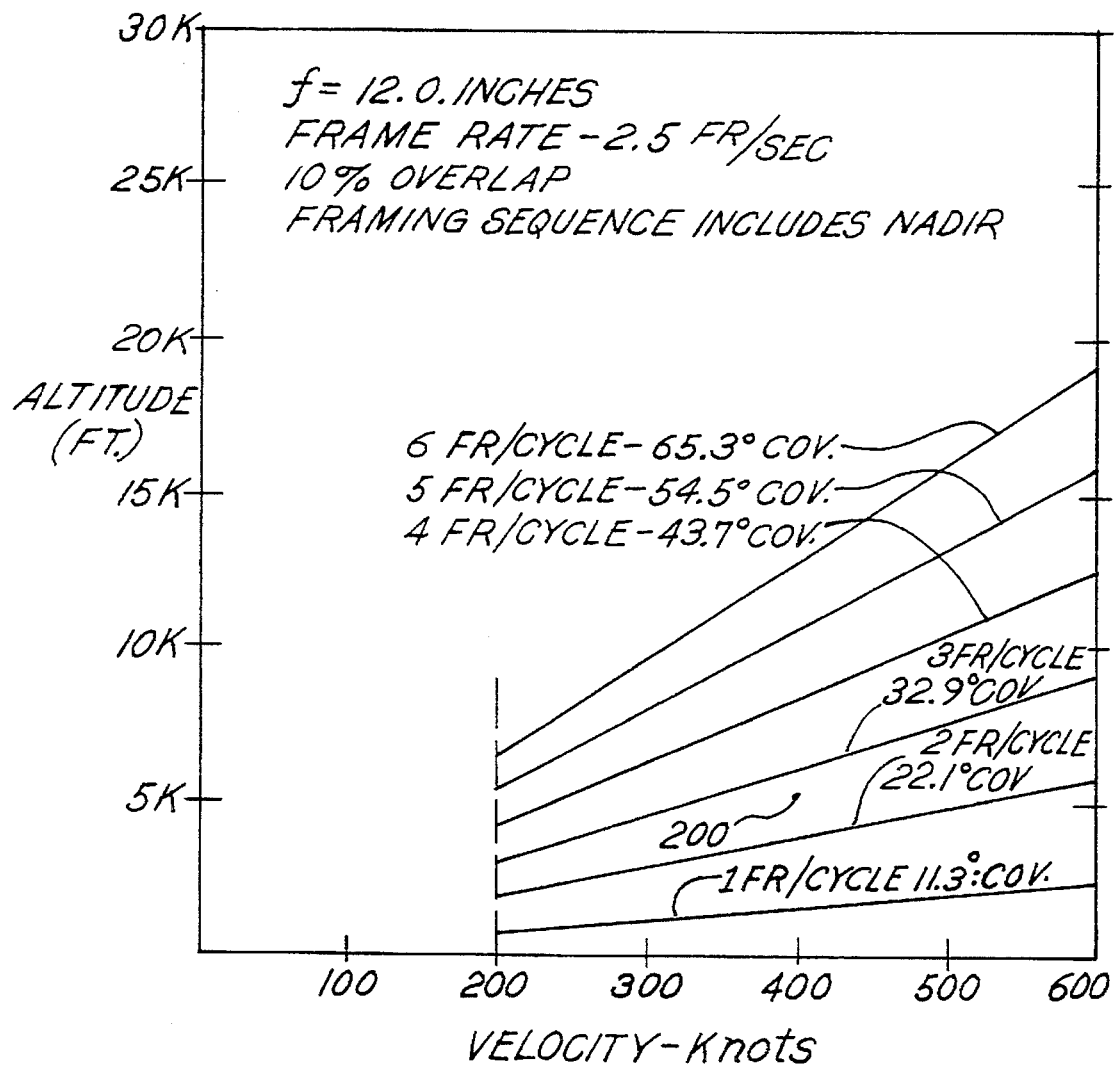

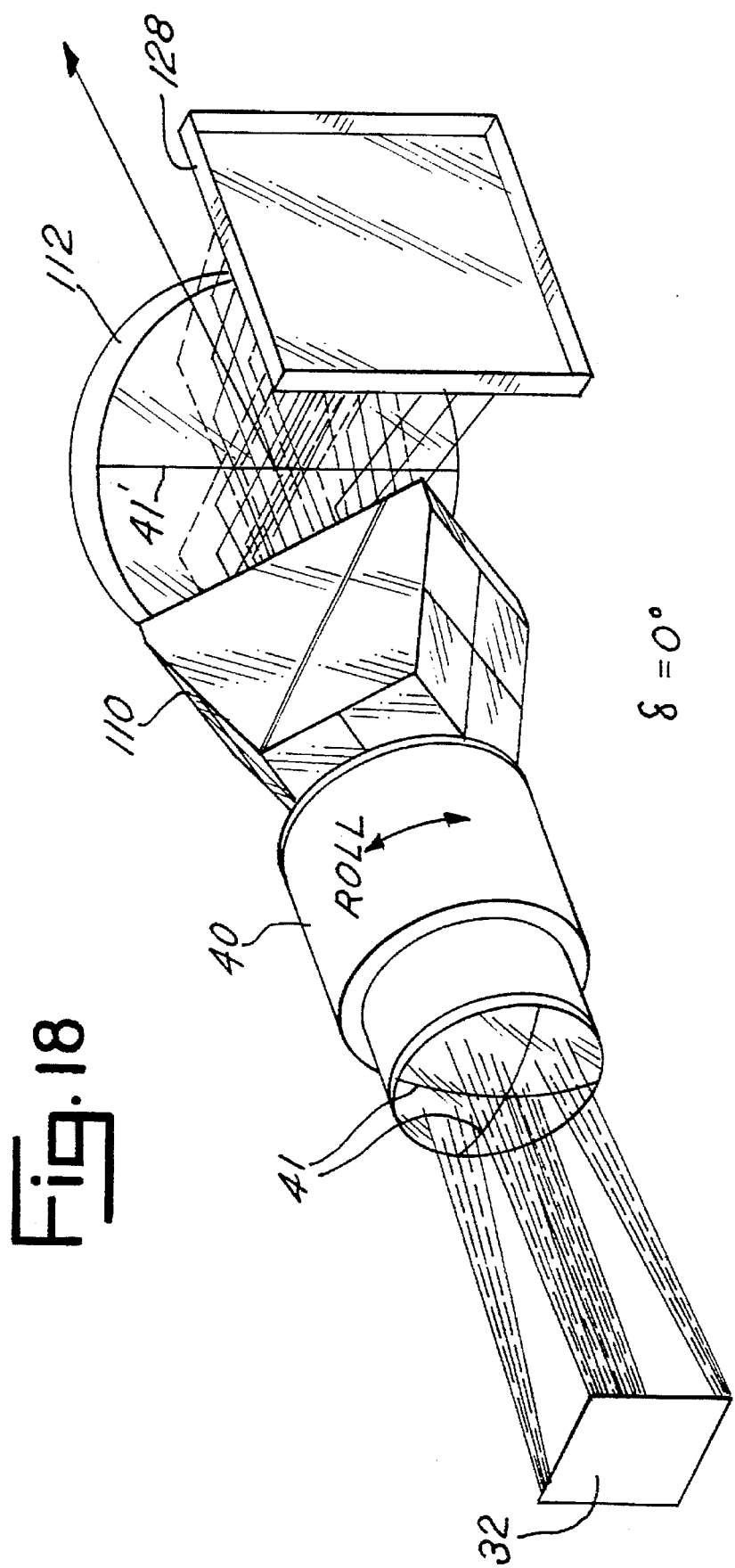

METHOD AND CAMERA SYSTEM FOR STEP FRAME RECONNAISSANCE WITH MOTION COMPENSATION

BACKGROUND OF THE INVENTION

1. Field of the Invention

This invention relates to the field of aerial reconnaissance camera systems. Generally speaking, aerial reconnaissance cameras are available in framing and pan scanning configurations. The present invention relates to both types of camera configurations, in that, on the one hand, the step-frame camera system generates individual frames of imagery, while on the other hand, the stepping operation of successive frames of imagery in a cycle generates sweeping scene coverage similar to that obtained with a panoramic camera.

2. Background Art

In a prior art framing camera, an exposure is taken over a large area of fixed format. The field of view of the camera is a function of lens focal length and the geometrical format size of the image recording media. The exposure time is generally controlled by a shutter and is a function of 1) the sensitivity of the photosensitive media, 2) lens transmittance and relative aperture, and 3) available scene brightness. The photosensitive material can be film, an area array Charge Coupled Device (CCD), or any other media which records an image for later retrieval.

Forward Motion Compensation (FMC), also known as Image Motion Compensation (IMC), is a technique used in framing cameras to correct for the image motion on the recording media caused by forward motion of the aircraft during the exposure interval. This correction is generally introduced by moving the film or the lens to keep the image stationary in the fore/aft direction while the exposure is taking place. In a framing camera, the correction is usually accomplished by moving the film to match the rate of image motion.

One limitation of a conventional film or CCD framing camera is that only a single FMC rate can be applied to any given frame regardless of the field of view. Consequently, the motion can exactly be corrected for only a portion of the image. When exposure times are short and the field angles small, this is acceptable. However, for larger fields of view and where longer exposure times are required (as at dusk or under other low light level conditions), the differential rate of motion between the film and the image increases with the field angle and can be large enough result in image blur at the edges of the field. A recent breakthrough in forward motion compensation in electro-optical framing cameras is disclosed in the Lareau et al. patent, U.S. Pat. No. 5,155,597, assigned to the assignee of the present invention. The Lareau et al. '597 patent, which is incorporated by reference herein, describes an electro-optical imaging array that accomplishes FMC electronically and without moving parts by dividing the columns of the array into multiple column groups, and by transferring pixel information in the column groups at a rate that substantially matches the rates of image motion in the column groups.

Another operational function of a framing camera is the generation of an overlap between successive frames of imagery. The overlap is used to ensure complete coverage of all areas of the scene, and/or to provide a view of the scene from two different angular perspectives yielding stereo imagery. In a conventional framing camera, the amount of overlap is selectable and nearly always takes place in the direction of flight.

FIG. 1 depicts a prior art framing camera having a lens 40 of focal length f, film 10 of area W×W, and exposure slit 12 which moves at velocity $V_S$. The film is moved at velocity $V_F$ to avoid image smear due to the forward motion of the aircraft (not shown) at velocity V. Two successive frames of a scene are taken at an interval $T_C$. The frame time $T_F$ is given by $W/V_S$. The return time for the shutter to retrace to its initial position is $T_R$. In FIG. 1, the overlap L(OL) of the two frames of imagery is about 10%, which is generally the minimum overlap. Typically overlap values of 10% or 12% and 56% are made available. An overlap of at least 50% allows all imagery in the adjacent frames to be exposed from two different angular perspectives. These images can be recombined by means of a stereo viewing system to achieve depth perception. Such stereo images are often used by a photointerpreter to gather additional information about the scene.

The operation of a film-type framing camera in a stepping mode is known in the art. For example, the article entitled "The KS-146A LOROP Camera System", Thomas C. Augustyn, SPIE Proceedings Vol.9, Aug. 27–28 1981, paper 309-11 p.76, describes an automatic stepping mode in which the camera cycle rate is proportional to aircraft velocity, altitude and selected depression angle, to achieve 56% overlap for stereo viewing or 12% overlap for maximum flight line coverage. With the camera line of sight normal to the flight path, the scan head provides either 1, 2, 4, or 6 lateral-step cycles. A similar stepping operation for a frame camera is described in the article entitled "KS-127A Long Range Oblique Reconnaissance Camera for RF-4 Aircraft", Richard C. Ruck and Oliver J. Smith, SPIE Proceedings Vol. 242, Jul. 29–30, 1980 San Diego Paper 242-02, p.22. However, the application of a stepping mode of operation to electro-optical framing cameras has, heretofore, eluded those in the art.

Panoramic (pan) camera technology is another well-established means of imaging and provides distinct advantages over the framing camera. In a panoramic scanning camera, as depicted in FIG. 2A, the scene is exposed continuously by rotating a scanning mechanism 14 (such as a double dove prism) so as to scan the image across the photosensitive medium 10. The angle delta The photosensitive medium 10 is moved in synchronism with the image. In the case of a film camera, this may be accomplished by moving the film at a constant rate past an exposure slit 12 which is located on the lens optical axis. A scan prism 14 located in front of the lens 40 is rotated in synchronism with the film rate such that the image of the scene remains stationary on the film during the exposure period. The slit opening is adjusted to a predetermined width to control exposure time.

One major advantage of a pan camera is its ability to image a large area in the direction across the line of flight. Scan angles across the line of flight on the order of 120 to over 180 degrees are typical. See FIG. 3. The lens field of view in a pan camera is generally only required to be large enough to cover the width of the film. Overlapping of images and stereo imagery may also be obtained with pan cameras. FIG. 3 shows overlapped pan camera images and the cycle time computation, with the depression angle delta equal to 90 degrees. Image overlap in a conventional fixed mounted pan camera is obtained as in the case of a framing camera, that is, in the common area between successive scans.

FMC for both the film and electro-optical versions of the pan camera is usually accomplished by a conventional electro-mechanical means. Translating the lens during the scan is a popular means to achieve graded FMC as a function of instantaneous slant range to the scene. This is illustrated in FIG. 2B, where $V_L$ is the lens velocity required for FMC.

In a pan camera system when the photosensitive medium is a linear electro-optical array, read out of the array to a data storage device and/or image display occurs dynamically while the image is being collected. The maximum scan rate which can be achieved is a function of the maximum data rate at which the array may be read out and the data processed. For electro-optical operation, a problem typically arises in that the scan rate of an electro-optical pan camera is very slow because it is limited by the CCD readout rate. Since the forward motion and altitude of the aircraft, expressed as a velocity/height (V/H) ratio, determines the FMC rate of travel, and since this is independent of camera scan rate, the translating lens used for FMC correction quickly runs out of travel when the scan rate is slow, which limits the angular field that can be scanned.

Thus, there has existed a need for an electro-optical imaging array that can obtain broad areas of scene coverage, in the manner of a panning camera, without the above limitations. The present invention provides an electro-optical step-frame camera system which generates high-resolution overlapped scene imagery without blur due to FMC errors. As such, it facilitates the processing and viewing of the digital stereo imagery on a computer or workstation equipped with a stereo monitor having active or passive glasses. The present invention is superior to prior film-type framing and panning cameras because it eliminates the need for a translating lens to accomplish FMC, and allows the camera to be independently repositioned during the stepping cycles during readout of the array. Further, it overcomes the single fixed rate FMC correction prevalent in the conventional framing cameras, producing extremely accurate image motion compensation in every frame of imagery.

The present invention possesses additional advantages and features. The camera system provides greater cross line of flight coverage, and therefore total area coverage, at nearly equivalent resolution to an electro-optical pan camera, even though the data rates of both cameras may be identical. In electro-optical pan cameras, the scene coverage that can be imaged a given time span is constrained by the relatively small number of pixels in a one-dimensional array. In the present invention, a much larger portion of the scene is imaged in a comparable time span, since the array is a two-dimensional array. Moreover, the present step-framing invention permits the readout of data from the array during the camera retrace period, essentially giving an extra picture during the stepping cycle, whereas prior art line scan panning cameras lose the retrace time since the array collects scene information and reads it out at the same time.

Further, imagery from prior art electro-optical pan cameras suffers from an "S" shaped distortion. This distortion arises from the footprint of the scan pattern across the field of interest, projected onto the ground, due to the forward aircraft motion. The present invention permits a stepping in the roll direction and a reposition in the fore/aft direction, thereby correcting any scene distortion due to forward aircraft motion.

Yet another feature and advantage of the present invention not available with conventional frame or pan cameras is the ability to couple a wide field of view with graded sector FMC and at the same time take pictures with a preselected amount of overlap in either the direction of flight or perpendicular to the direction of flight, to achieve total scene coverage. Additionally, a two-axis stepping is made possible, that is, a stepping of the line of sight between successive frames in both azimuth and depression. Only one stepping mechanism (e.g., a mirror or prism) is needed to accomplish the two-axis stepping, as the stepping mechanism is rotated about two axes. A derotation prism or other equivalent optical element eliminates the combined image rotation effects. The two-axis stepping facilitates optional multi-aspect or rapid azimuth coverage with a single point perspective.

These and other features and advantages of the invention will be apparent from the following detailed description of the invention.

SUMMARY OF THE INVENTION

These and other features of the invention are achieved by our method for imaging a scene with an array of photosensitive cells and a stepping mechanism. The array of cells store pixel information and are arranged in a plurality of rows and columns. The columns of the array are organized into a plurality of column groups, including a first column group and a second column group. The method comprises the sequence of operations of:

(a) directing with the stepping mechanism adjacent portions of an image of a scene upon the array, the operation of directing performed in a sequence of discrete preselected angular steps, each of the steps separated in time by a predetermined framing interval during which the photosensitive cells of the array are exposed to the image of the scene;

(b) during at least one of the predetermined framing intervals, transferring pixel information in the first column group of the array at a first transfer rate and simultaneously transferring pixel information in the second column group at a second transfer rate different from the first transfer rate, the transferring of pixel information compensating for different rates of image motion for portions of the image directed to the first and second column groups, respectively, to thereby prevent smearing of an image produced by the array;

(c) during the time period of each of said steps of the stepping mechanism, reading out the pixel information from the array of cells into a data storage or display device; and (d) repeating operations (a), (b) and (c) in a series of cycles, thereby generating a series of images of the scene with the array of cells.

Typically, the above method is performed in an aircraft, and the method may further comprise the adjusting of the discrete steps of the stepping mechanism and adjusting the rate of transferring of pixel information in the first and second column groups as the velocity to height ratio of the aircraft varies as the aircraft flies past a terrain of interest.

BRIEF DESCRIPTION OF THE DRAWINGS

The preferred embodiment of the present invention will be described in conjunction with the accompanying drawings, wherein like reference numerals refer to like elements in the various views, and wherein:

FIG. 3 is a schematic illustration of a prior art panoramic (pan) camera system imaging a scene of interest;

FIG. 4A is a perspective view of an aerial reconnaissance aircraft with the imaging array and lens components shown greatly enlarged as the aircraft flies over a scene of interest;

FIG. 4B is a perspective view of the array of FIG. 4A showing the interrelationship of the imaging array and its associated lens system;

FIG. 5A is a detailed elevation view of a preferred form of the array, stepping mechanism and optical system of FIG. 4B, with a portion of the camera housing broken away to show the array itself;

FIG. 5B is an elevational view of an alternative embodiment of the stepping mechanism, in which the stepping drive is placed so as to rotate the mirror and pechan prism;

FIG. 5C is another alternative embodiment to the construction of FIGS. 5A and 5B, wherein a stepping prism is used instead of a mirror;

FIG. 5D is a diagram of the embodiment of FIG. 5A, showing in block diagram form the relationship between the camera assembly and the aircraft instrumentation, power supply, and a servo control electronics unit;

FIG. 6 is a perspective view of the aircraft of FIG. 4A flying over the scene of interest, showing the successive frames of images that are generated from the array when the stepping mechanism of FIG. 5 is operated in cycles of operation as described herein, with the forward motion compensation performed in each of the frames of images;

FIG. 7 is a perspective view of the aircraft of FIG. 4A flying over the scene of interest at a greater velocity to height ratio than in the case of FIG. 6, and in which the frame of imagery of the scene of interest includes a frame at nadir;

FIG. 8 is a perspective view of the aircraft of FIG. 4A flying over the scene of interest and operating in a stepping mode to create pan-type scene coverage on both sides of nadir;

FIG. 11 is a block diagram of a preferred form of electronics and control circuitry that operates the electro-optical imaging array of FIG. 4B;

FIG. 12 is a block diagram of the drive and control circuitry shown in FIG. 11, illustrating the counter and clock drivers which transfer pixel information in each of the column groups of the imaging array shown in FIG. 10;

FIG. 14 is a schematic drawing of one section of an arbitrary column group showing the metalization on top of the channel stop region between photosites of the array to provide the three-phase drive clocking to the column group;

FIG. 16 is a graph of the number of frames (or steps) that can be taken in a cycle of operation of the stepping mechanism of FIG. 5, and of the scene coverage, as a function of the aircraft's velocity and height above ground;

FIG. 18 is an illustration of the ray tracing for the stepping mechanism of FIG. 5A when the stepping mirror has been stepped about the roll axis through an angle of 90°, with the pechan prism stepped through an angle of 45°, relative to the orientation of FIG. 17.

DESCRIPTION OF THE PREFERRED EMBODIMENT OF THE INVENTION

A. General Discussion

Figure 1:
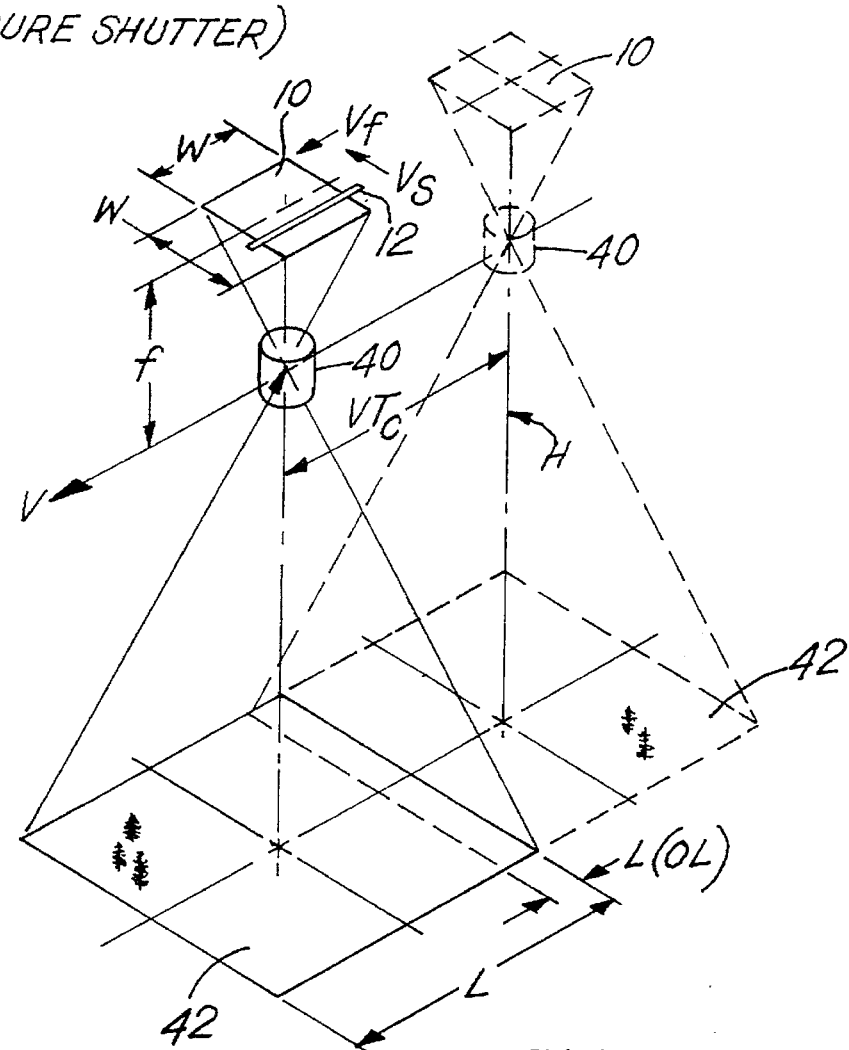
FIG. 1 is a schematic drawing of a prior art framing camera carried in an aerial reconnaissance aircraft generating successive images of a terrain of interest.
Figure 2A:
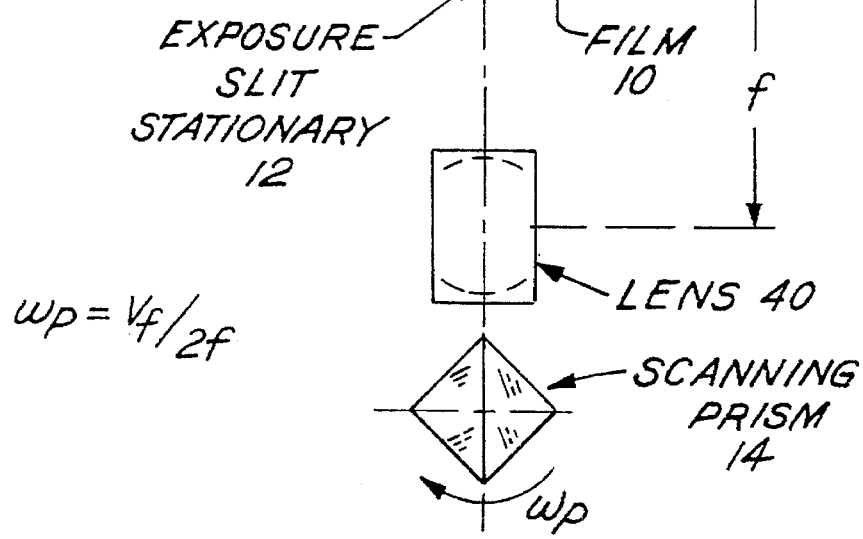
FIG. 2A is a simplified schematic drawing of a prior art scanning prism, lens and exposure slit used in a film panoramic camera.
Figure 2B:
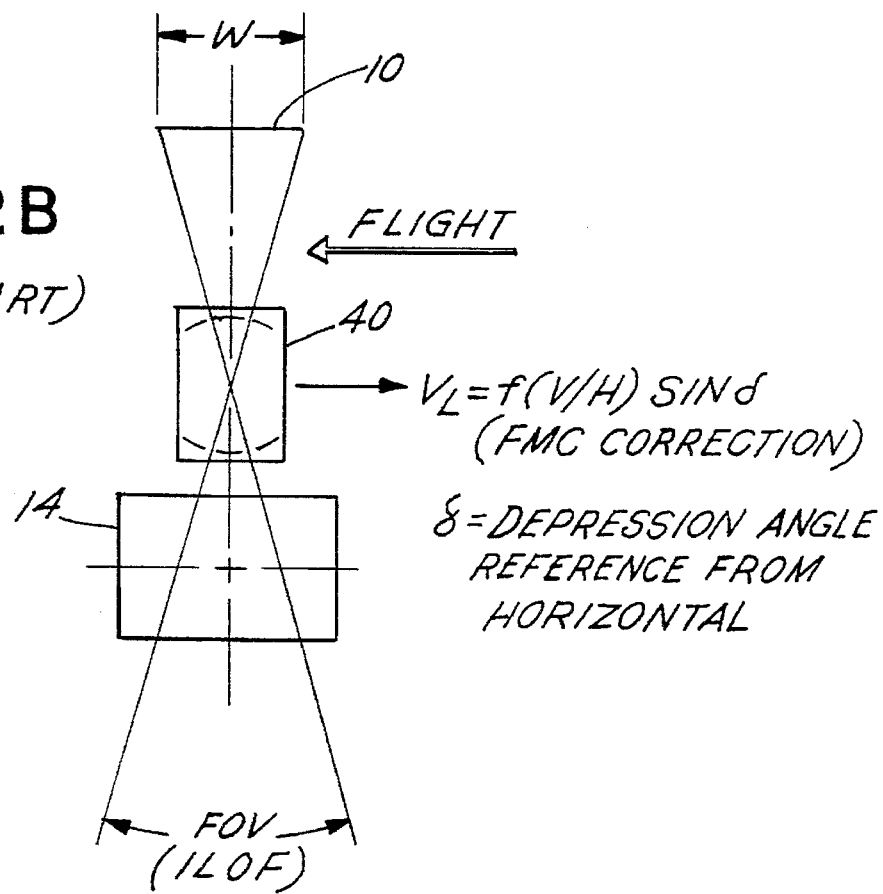
FIG. 2B is a simplified schematic drawing of a prior art moving lens forward motion compensation technique used in film panoramic cameras.

Referring to FIG. 4A, a preferred form of the invention is implemented in a reconnaissance system 20 installed in an aircraft 22 that defines orthogonal roll, pitch and yaw axes R, PI and Y, respectively, each passing through a center of gravity CG. The roll and pitch axes define a bilateral plane BP that is horizontal during level flight. System 20 includes a camera assembly 36 defining a lens axis LA that can be directed toward a scene of interest. The stepping and derotation equipment that is placed in front of the camera assembly 36 is shown in detail in FIG. 5 and discussed in detail below. In FIG. 4A, the camera assembly 36 is shown oriented in a side oblique position for the sake of illustration, but in practice the camera assembly 38 is positioned in the aircraft such that the camera lens and lens axis LA are oriented in a forward direction such that lens axis LA is parallel to the roll axis R. The stepping and deroration equipment is placed in front of the camera lens such that the scene can be stepped in the cross-line-of-flight direction (i.e., in depression) and in azimuth (i.e., about the pitch axis PI).

Aircraft 22 has an avionics system 24 which provides to system 20 input signals indicating aircraft ground velocity (V), aircraft height above ground (H), and aircraft roll, pitch and yaw angular position data. From camera control console 28, an operator 26 provides additional inputs into system 20, such as an initial camera depression angle δ between axis LA and plane BP. The inputs from the avionics system 24 and console 28 are fed to a camera control computer 34 which processes the inputs, together with pre-flight programmed information, and generates control signals for camera assembly 36.

Referring to FIG. 4B, camera assembly 36 includes an imaging array 32 defining a focal plane FP having a center point CE. Camera assembly 36 also includes a housing 38 and a lens 40 having a focal length f (not shown in FIG. 4B) and defining axis LA that passes through point CE. The stepping mechanism and derotation equipment is not shown in FIG. 4B so as to better illustrate the lens 40 and array 32. A shutter 41 is provided to selectively expose array 32 to radiation from the scene. Typically, housing 38 is isolated from the aircraft 22 in order to reduce vibration or other high frequency, low-amplitude motions. Printed circuit boards 39A, 39B incorporate the electronics that support operation of array 32. Up to eleven such boards 39A, 39B may be required to accommodate all of the electronics for the array 32. It is preferable that the array 32 is kept at a constant temperature (e.g. 10° C.). To achieve this, a heat sink is coupled to the board 39A that the array 32 is mounted to. Additionally, the electronics boards 39B etc. have cooling fins (not shown) to dissipate heat generated by the electronics. A fan or fans (reference numeral 63 in FIG. 5A) circulate air in the camera housing 38 to help keep the electronics and array cool. These temperature control techniques are conventional and well known in the art.

Referring now to FIG. 5A, the camera assembly 36 of FIGS. 4A and 4B is shown in an assembled condition with the stepping mechanism 100 placed in front of camera housing 38, lens housing 104 and lens 40, in alignment with the lens axis LA. An image sensor unit (ISU) 60 is placed directly behind the array 32. The image sensor unit 60 includes the camera control computer 34, the drive and control electronics circuitry 54, the signal processing circuitry 56, and the master clock 58, which are all discussed in detail below. Fans 63 cirulate air in the camera housing 38 and image sensor unit 60. Incident light comes through a window 128, where it is reflected off mirror 112 towards lens 40.

The stepping mechanism 100 includes a housing 102 that encloses a stepping drive assembly 106 that moves the stepping (or pointing) mirror 112 in a series of discrete angular steps in a cycle, to cause the array 32 to generate a series of frames of a scene. The stepping drive 106 includes a rotor 122A and stator 124A. Bearings 126A isolate housing 102 from housing 104. The stepping mechanism 100 also includes a derotation means (such as a pechan prism) 110 and a derotation drive 108. The derotation drive 108 includes rotor 122B, stator 124B and bearing 126B. An azimuth drive (not shown) is mounted concentric with the pitch axis PI to rotate the mirror 112 about the pitch axis PI. This drive is preferrably a small, relatively flat motor that is sometimes referred to in the art as a "pancake" motor. The stepping in azimuth is usually one on the order of a few degrees, and sufficient clearance between the mirror and the mirror mounting structure 111 should be provided.

The derotation drive 108 steps the pechan prism 110 in the same direction as the stepping mirror 112, and has the effect of removing rotations introduced in the image by the rotation of the stepping mirror 112 about lens axis LA. The pechan prism 110 is stepped at one-half the angular increment of the stepping mirror 112. Pechan prisms 110 are per se known in art. Detailed information on pechan prisms is contained in MIL-HNBK-141, p. 13–36, and U.S. Pat. Nos. 3,981,574 and 4,080,056, which are incorporated by reference herein.

It should be noted that rotational effects caused by the rotation of the stepping mirror 112 could also be removed by rotation of the entire camera housing 38 about lens axis LA, or by rotation of the array 32 itself. Other equivalent devices to the pechan prism 110 can be used for the derotation, such as a K mirror (a three mirror assembly), a dove prism, or a delta prism, each of which is well known to persons of skill in the art. The rotation in azimuth does not introduce rotations in the image.

Alternatives to the stepping mirror 112 can be used to direct light from the scene onto the array 32. For example, a stepping prism rotated by the stepping drive 106 will accomplish the same result.

Two-axis stepping of the mirror 112 may be performed without the use of a second stepping prism and drive. The stepping mirror 112 is stepped in two axes, for example, azimuth and depression and the pechan prism 110 is rotated about the roll axis. With two axis stepping, the camera can generate a series of frames of a target from multiple perspectives as the aircraft flies past the target, or align the cross-line of flight frame boundaries so as to be co-linear.

FIG. 5B shows an alternative embodiment to the stepping mechanism 100. In this embodiment, the stepping drive 106 is positioned behind the pechan prism 110. The stepping drive 106 rotates housing 102 relative to lens housing 104 to accomplish rotation about an axis coincident with lens axis LA, (i.e., the roll axis) while the mirror rotates about the azimuth axis to accomplish two-axis stepping.

Another alternative embodiment is shown in FIG. 5C, in which a stepping prism (such as a right angle prism) 109 is used in place of the stepping mirror 112 of FIGS. 5A and 5B. The choice between the embodiments of FIGS. 5A–5C depends on factors such as cost and weight. Similarly, derotation mechanisms other than the pechan prism may be preferred because of size, cost or weight. The embodiment of FIG. 5A is presently preferred due to the fact that the stepping mechanism 100 has less mass, and the stepping drive 106 has less mass to rotate. However, it will be understood that other embodiments may be preferred for other implementations.

Referring to FIG. 5D, the embodiment of the camera assembly 38 and stepping mechanism is shown in conjunction with additional support and aircraft inputs, shown in block diagram form. The aircraft Inertial Navigation System (INS) and Global Positioning System (GPS) data is supplied to the camera's ISU 60, along with operator input from camera control console 28. (See also FIG. 4A). A power supply 134 supplies power to a servo control electronics unit 136 and to the ISU 60. The servo control electronics unit 136 supplies commands via bus 140 to the derotation drive 108, and by bus 142 to the stepping drive 106 and the azimuth drives. An RS 232 interface 146 is provided to the camera control computer 34 (FIG. 11).

As can be seen from FIG. 5A and the above discussion, the preferred embodiment is a 3 axis system, with a stepping drive 106, an azimuth drive (not shown), and a derotation drive 108. Two axis stabilization is provided by the stepping and azimuth drives. The stepping drive 106 also performs the step motion about the roll axis. The azimuth drive compensates for aircraft motion between frames. The derotation drive 108 removes the image rotation caused by the motion of the stepping drive 106. Suitable servomotors for use in the stepping mechanism can be obtained from Inland. In general, the derotation drive motion is one half of the stepping drive motion. The alternate embodiment of FIG. 5B has the derotation drive 108 mounted on and moving with the stepping drive 106. In this case, the derotation motion is negative one half of the stepping drive motion. The positive or negative one half derotation motion is regulated by position sensors (not shown) on the stepping and derotation drives. The stepping and azimuth drives also have inertial rate and acceleration sensors for performing stabilization, and implement the stabilization techniques disclosed in application Ser. No. 08/225,439, filed Apr. 8, 1994, which is incorporated by reference herein.

The operation of the stepping camera is as follows. Referring to FIG. 5A and FIG. 6, the stepping prism 112 is pointed to a predetermined depression angle $\delta_1$ from the horizontal plane BP. During a predetermined framing interval, the shutter 41 is opened and the image is directed on to the array 32. During the flaming interval, image motion compensation is performed in the array 32 in the manner described in detail below. After the proper amount of scene exposure (depending on, e.g., light level), the shutter 41 is closed. At the end of the flaming interval, the stepping prism 112 steps about the roll axis a discrete preselected angular step across the field of interest to a new depression angle $\delta_2$. During the period of time in which the stepping mechanism 100 makes the transition to the second position, the pixel information in the array 32 corresponding to the first image is read out to a data storage device. When the stepping mechanism 100 is in the second position, the second framing interval begins, and the shutter 41 opens and the generation of the second frame of imagery occurs. Image motion compensation is again performed in the array, taking into account the new depression angle, and updated velocity and height information. At the end of the second framing interval, the data is read out of the array 32 as the stepping mechanism 100 steps a predetermined angular step to the third position, with the camera depression angle being $\delta_3$. The image generation and image motion compensation process is repeated in the third framing interval. This process repeats for a finite number of steps (for example, 6). After the last framing interval, the data from the last image is read out, during which time the stepping mechanism 100 retraces back to the initial angular position $\delta_1$. The cycle of a finite number of steps, separated in time by framing intervals, is repeated as necessary as the aircraft flies over the terrain of interest.

Figure 17:
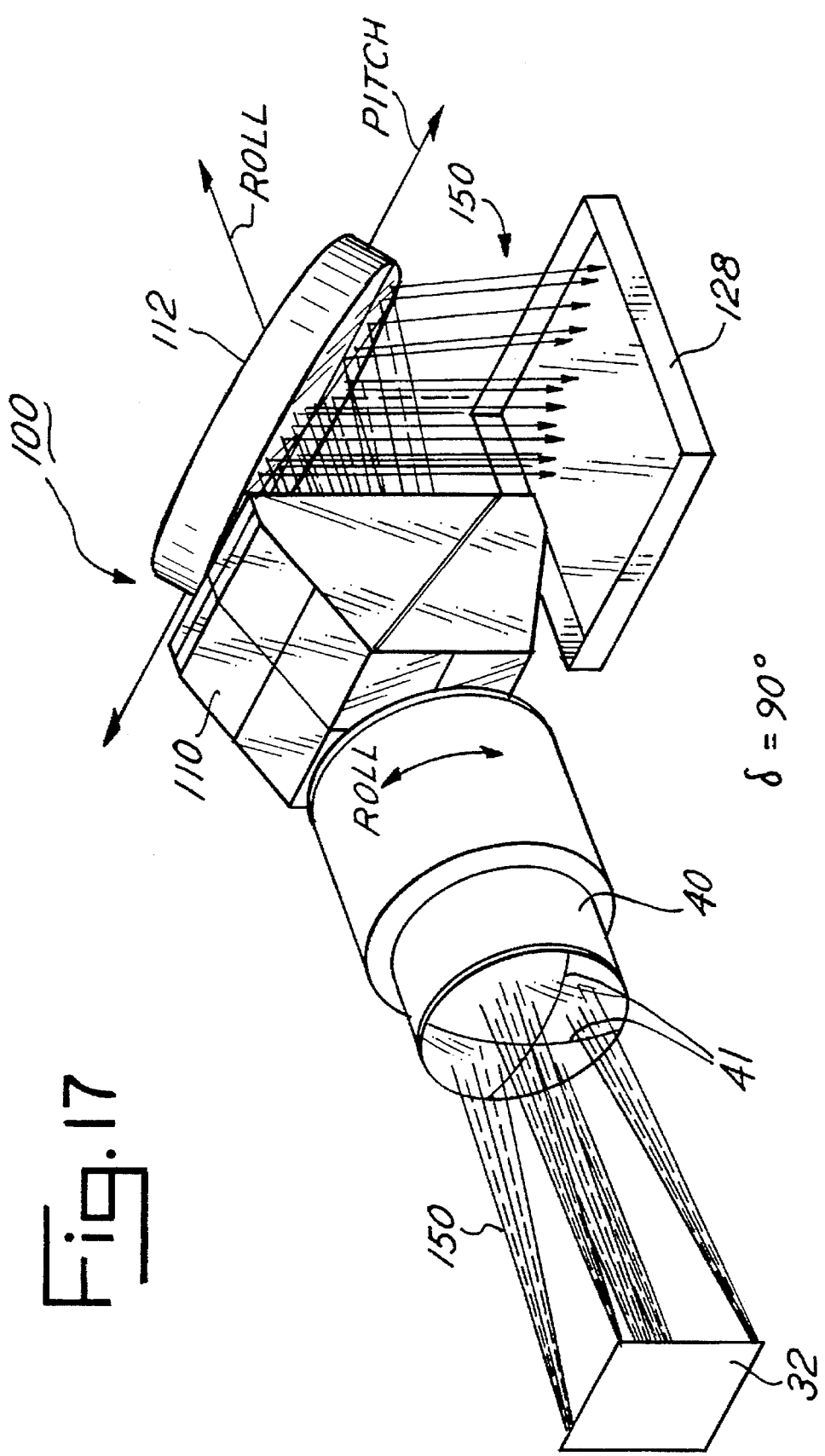
FIG. 17 is an illustration of the ray tracing for the stepping mechanism of FIG. 5A.

FIGS. 17 and 18 show the ray tracing of incident light 150 from the scene through the stepping mechanism 100 and lens 40. The light 150 passes through window 128, and reflects off mirror 112 through pechan prism 110 into lens 40, where it is focused onto the array 32. In FIG. 18, the mirror 112 has been stepped about roll axis through 90 degrees relative to the orientation in FIG. 17. Note that the "cross-hairs" 41 corresponding to portions 41' of the mirror 112 on the lens 40 have not moved from FIG. 17 to FIG. 18, which is intended to illustrate the effect of the pechan prism 110 in derotating the image due to the rotation of the mirror 112.

As the aircraft 32 flies over the scene of interest, the amount of cross-line-of-flight terrain that can be completely imaged is related to the aircraft's velocity-to-height ratio. As the velocity to height ratio increases, the number of steps in the stepping cycle decreases. In the present invention, the aircraft velocity and height information is continually monitored. The operation of the stepping drive 106 is continually adjusted to decrease or increase the number of angular steps of the stepping mirror 112 as necessary so as to avoid gaps in scene coverage between successive cycles of the stepping mechanism 100. Similarly, the amount of overlap between successive frames can be controlled.

In a system that has a lens with a focal length of 12 inches, a frame rate of 2.5 frames per second, and 10% overlap between successive frames, the number of frames that can be taken in a stepping cycle, as a function of aircraft velocity and height, is set forth in graphical form in FIG. 16. For example, if the velocity is 400 knots and altitude is 5,000 feet (point 200), 2 frames per cycle is the maximum number of frames without gaps in scene coverage assuming a 10% between successive frames. At 10,000 feet, six frames per cycle can be obtained for velocities below about 329 knots, five frames at velocities between 320 knots and 400 knots, four frames at velocities between 400 knots and about 480 knots, and three frames above 480 knots. This information is contained in a memory or derived via a software routine implemented in the camera control computer 34 (FIG. 11).

In particular, the mathematical relationship giving the available V/H envelopes for a given cycle time (and hence number of frames) is:

$$\frac{V}{H} = \frac{W_y(1 - OL_y)}{f(CT)\text{SIN } \delta_m}$$

where $W_y$=format size in flight direction (mm)
$OL_y$=desired overlap (decimal fraction) at near edge of frame closest to nadir
f=focal length (mm)

CT=cycle time (defined below) (sec)
and
$\delta_m$=depression angle at frame edge nearest to nadir
The cycle time (CT) is:

$$CT = \frac{NF - 1}{(FR)} + t_R$$

where
NF=number of frames/cycle
FR=frame rate (frames/sec)
$t_R$=sensor reset time (sec)

$$t_R = \frac{NF + 1}{2(FR)}$$

therefore, $$CT = \frac{(3/2)NF - 0.5}{(FR)}$$

In the preferred embodiment, the framing interval is 0.4 seconds per frame, therefore the frames are imaged at a rate of 2.5 frames per second. This framing interval does not change as the velocity-to-height ratio changes. This rate is generally constrained to the maximum data rate at which pixel information in the array can be processed. Also, this rate may be limited by the maximum rate at which the stepping mechanism can be repositioned between discrete angular steps.

Referring to FIG. 6, the above-described operation of the camera is illustrated. The aircraft 22 flies over the scene of interest 42. The camera assembly 36 is shown in a side-oblique orientation. The stepping mechanism 100 operates, in this example, in a series of cycles of six steps per cycle. The array 32 generates images 1-6 during the six framing intervals in the first cycle. Note the small overlap in the cross line-of-flight direction between each of the images, and overlap in the line-of-flight direction between successive cycles. After the stepping mechanism 100 retraces to the original position, the next cycle of steps is performed, during which images 1A, 2A, . . . 6A are generated in the six framing intervals. The process repeats and the third set of images 1B, 2B . . . 6B, etc. are generated in the third cycle. In this manner, broad coverage of the scene 42 is created. During each of the frames 1-6, 1A-6A, etc. image motion compensation in the array 32 is performed electronically and without moving parts as explained in detail below.

In the preferred embodiment, the stepping prism is also stepped in azimuth (pitch) to eliminate the slight staggering 120 between adjacent frames in the cycle, so that the boundaries of the image frames form a straight line 130 in the cross-line-of-flight direction. Specifically, the stepping of the stepping prism 112 about the pitch axis moves frame 2 over so that the cross-line-of-flight edges of frame 2 are aligned with the edges of frame 1. Similarly, stepping in pitch for frame 3 moves frame 3 over so that the cross-line-of-flights boundary of frame 3 is aligned with the boundaries of frames 1 and 2. As the stepping proceeds in the cycle, progressively larger stepping increments in pitch are needed to maintain alignment of the frame boundaries in the cross-line-of-flight direction.

As noted above, if the aircraft altitude decreases or the velocity increases, the stepping cycle may have to be adjusted to avoid creating gaps in scene coverage between successive cycles. FIG. 7 shows the aircraft 22 flying in a higher velocity to height ratio regime as compared to FIG. 6, in which only four frames of imagery are taken in the stepping cycle. The transition between the regime of FIG. 6 to the regime of FIG. 7 may be direct (i.e., in successive cycles), or there may be intermediate cycles of operations between the regimes (e.g., a cycle of five frames). In this example, two-axis stepping is performed so as to provide a straight line 130 in the cross-line of flight image boundary. Additionally, the terrain of interest may include a portion at nadir, thus the initial and final camera depression angles may be adjusted by the camera operator during the reconnaissance mission and the operation of the camera adjusted accordingly. In this example, forward motion compensation is being performed in each of the frames of imagery.

Referring to FIG. 8, the array may be stepped in a manner so as to generate frames of imagery on both sides of nadir. In the example of FIG. 8, the initial and final camera depression angles relative to the horizontal plane BP are the same, but this does not necessarily have to be the case. Additionally, the amount of overlap in the cross-line-of-flight direction may be limited if maximum scene coverage in a cycle of steps of the stepping mechanism 100 is desired. This is because each cycle of steps has a finite number of frames of imagery that can be obtained at the maximum frame rate without creating gaps in scene coverage. As the amount of overlap between successive frames increases, the amount of total scene coverage decreases.

B. Image Motion Compensation During the Framing Intervals

Figure 9:
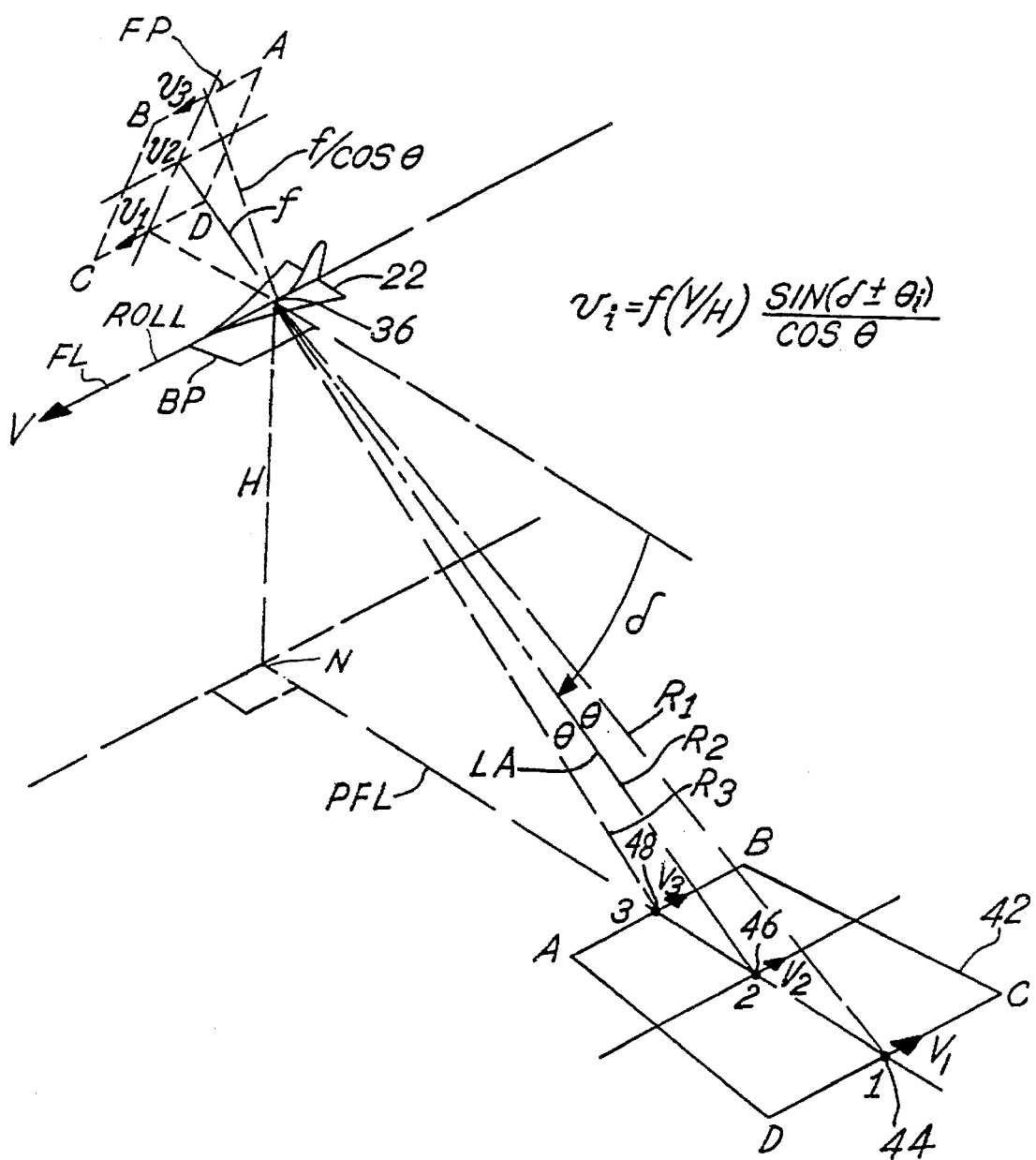
FIG. 9 is a schematic drawing of the reconnaissance aircraft and terrain of FIG. 6 from an oblique perspective, illustrating the focal plane of the camera assembly greatly enlarged and displaced in order to clearly show the relationship between the focal plane and a scene of interest for a single frame, and the variations in image motion in the plane of the array due to the varying distances from the array and the portions of the scene imaged by the array.
Figure 10:
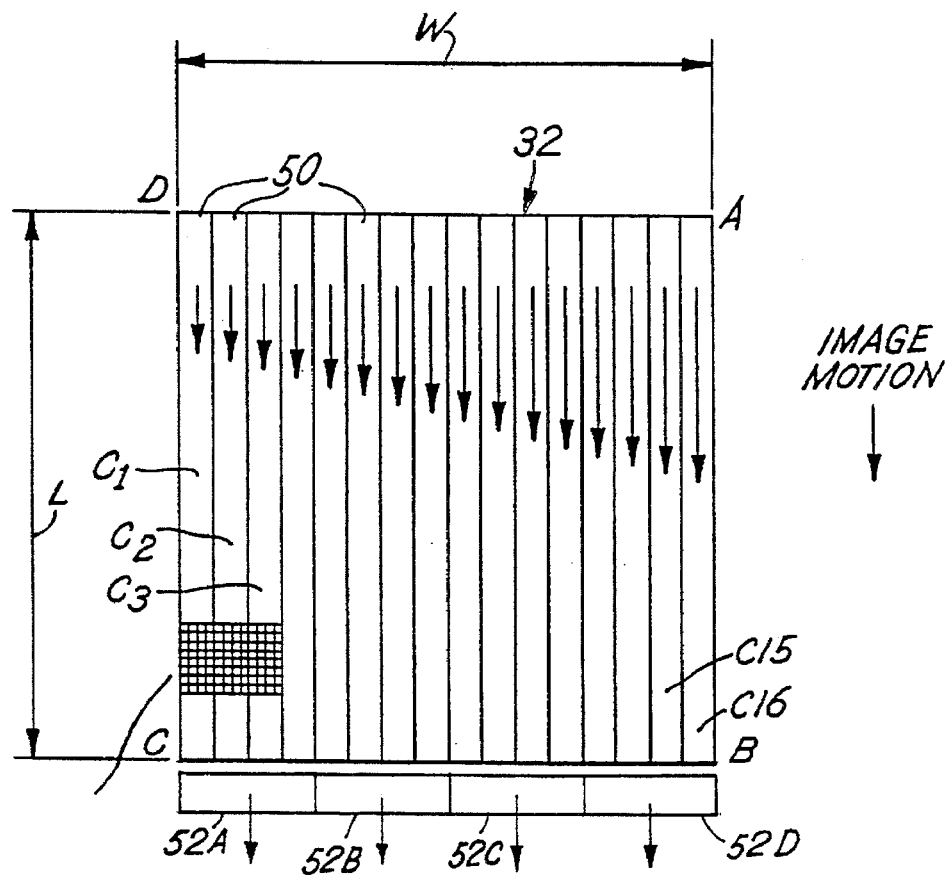
FIG. 10 is a schematic drawing of the imaging array of FIG. 4B showing the arrangement of the array in rows and columns, the organization of the columns into a plurality of column groups and the transfer of pixel information in each group at different predetermined and distinct transfer rates due to the different rates of image motion at the plane of the array.

FIGS. 9 and 10 together illustrate a preferred technique of forward motion compensation that is implemented during the framing intervals described above. FIG. 9 shows aircraft 22 carrying the camera assembly 36 operating in a side oblique mode, in which focal plane FP of imaging array 32 is oriented parallel to a line of flight vector FL coincident with roll axis R that defines the direction of motion of aircraft 22 and array 32. Referring to FIGS. 4B and 9, focal plane FP defines a plane PFL that is collinear with axis LA, passes through center point CE and is perpendicular to plane FP and vector FL. Focal plane FP also defines another plane PS that is collinear with axis LA, passes through center point CE and is perpendicular to planes FP and PFL and parallel to vector FL. Aircraft 22 flies over the terrain at velocity V and at height H. In order to image a scene 42, lens axis LA and plane PS of array 32 (FIG. 4B) are oriented at depression angle $\delta$ with respect to plane BP (FIG. 4).

Lens 40 focuses light from scene 42 onto imaging array 32, which is placed at the focal plane FP of the lens. The boundary of the scene 42 is defined by points A–D, and the corresponding points in plane FP in FIG. 4 are shown with like letters.

Lens 40 focuses scene 42 onto imaging array 32, which is placed at the focal plane FP of the lens. The boundary of the scene is defined by points A–D, and the corresponding points in plane FP are shown with like letters. The rate of image motion is not constant throughout the array, but rather is dependent upon the range or distance between lens 40 and the points of the scene lying in plane PFL. The greater the range, the slower the rate of image motion in focal plane FP of the lens. More specifically, the rate of image motion in the array at an arbitrary point, $V_i$, is equal to $(f/\cos \theta)(V/R_i)$, where $\theta$ is the field of view half angle, and $R_i$ is the range between the lens and the terrain point corresponding to the point $V_i$. Since focal length F normally is very small compared to range $R_i$, $R_i$ can be approximated by using the distance between the terrain point and the array or aircraft. As shown in FIG. 9, if point 44 on the terrain farthest from aircraft 22 is chosen (i.e., the midpoint of line segment CD), the image velocity $v_1$ is equal to $(f/\cos \theta)(V/R_1)$.

It can be shown that $R_i = H/\sin(\delta \pm \theta_i)$, so $$V_i = [f(V)\sin(\delta \pm \theta_i)]/H \cos \theta_i$$

Similarly, it follows that the image velocity in the array for point $V_2$ (corresponding to terrain point 46) is $f(V/H)(\sin \delta)$ and for point $V_3$ (corresponding to terrain point 48) is $$f(V/H) \frac{\sin(\delta + \theta)}{\cos \theta} .$$

Referring to FIG. 9 and FIG. 10, the boundary of the image of scene 42 on array 32 is indicated by points A–D which correspond to the like lettered points of scene 42. Width W of array 32 preferably is 48 to 60 mm and represents 4800 to 6000 pixels. Length L of array 32 preferably is 48 to 60 mm and represents 4800 to 6000 pixels. Only a few of the pixels 51 are shown schematically in FIG. 10. The pixels of array 32 are divided into rows and columns, and the columns, in turn, are organized into a plurality of column groups 50. The number of column groups selected may vary depending on the operational parameters of the system, the degree of resolution required, and the desired cost to performance ratio. It has been found that 16 column groups provide a very high level of forward motion compensation for array 32 and are an acceptable number of groups in an array having approximately 5,000 individual columns.

Still referring to FIG. 10, each column group 50 has its own separate variable (and adjustable) charge transfer rate (generally measured in pixels/second) which is adjusted between successive frames to the estimated image motion rate. The variable charge transfer rates are represented as arrows, and the longer arrows represent faster rates. Referring to FIG. 10, and the example in FIG. 9, column group C16, which images the terrain closest to line AB (FIG. 9), has a relatively fast charge transfer rate, since line AB is closest to aircraft 22, and the image motion is relatively rapid in that portion of scene 42. Column group C15 is also given a relatively fast charge transfer rate, due to the closeness of the terrain imaged by that column group. Generally speaking, if the terrain is flat, the charge transfer rates vary monotonically across the array when the array is oriented in a side-oblique mode.

It will be readily understood that the charge transfer rates shown in the example of FIG. 10 are unique to the particular terrain 42 imaged at one particular point in time. As the aircraft flies over the terrain and takes successive exposures, the V/H ratio and camera depression angles vary. As discussed in detail below, the signal processing circuitry and camera control electronics are used to adjust the charge transfer rates between successive exposures to ensure that, during the exposure period, the charge transfer rates for each of the column groups are continually updated to closely match the image motion rates.

Referring again to FIG. 10, during the exposure time period when shutter 41 is open, charge representing scene information is collected in pixels in array 32 and is transferred from one adjacent pixel to another according to the selected charge transfer rates in the column groups. When the exposure time period ends (i.e., when shutter 41 is closed), the accumulated charge representing the scene is sequentially read out of array 32 one row at a time into readout registers 52A–52D. From readout registers 52A–52D, the information is fed to signal processing circuitry and a data storage or display device. During readout, the array is stepped to the next depression angle in the stepping cycle. When the readout is complete, array 32 is ready for the next scene exposure. At this point, and as discussed in detail below, the charge transfer rates for each of the column groups are updated depending on new inputs, such as aircraft velocity, height, and camera depression angle. In this manner, the charge transfer rates are continually adjusted between successive frames to match the charge transfer rates in the several column groups with the image motion rates in the column group.

Referring to FIG. 11, the camera assembly 36 and its associated control circuitry are illustrated in block diagram form. Avionics system 24 provides velocity and height information over a bus 25 as inputs to camera control computer 34. From console 28, the operator inputs into computer 34 over a bus 29 the initial and final depression angles $\delta_1$ and $\delta_N$ in degrees and the amount of overlap between images. Stored in computer 34 are mission parameters that are previously determined, e.g., focal length f of lens 40, the mode of operation (side oblique or forward oblique), the size of array 32, number of column groups, pixel size, and a control circuit master clock frequency (discussed below).

After processing the data inputs, computer 34 transmits signals over a bus 35 that enable lens axis LA of camera 36 to be directed to the desired orientation, transmits signals over a bus 37 that controls the frame exposure time period by enabling opening and closing of shutter 41, and transmits command signals over a bus 64 to the drive and control electronics 54. Drive and control electronics 54 transmits signals over a bus 68 that organizes the columns of array 32 into one or more groups and that transfer pixel information located in the one or more groups at one or more predetermined transfer rates. A master clock 58 issues pulses over a conductor 59 at a predetermined master clock frequency to drive and control electronics 54. Alternatively, the master clock pulses may be supplied by computer 34.

Scene information in imaging array 32 is fed over a bus or cable 53 to a signal processing unit 56 which, in turn, sends the information over a bus 55 to a recording or viewing device 57, or to a data link for transmission to a remote location. Signal processing unit 56 also provides exposure control feedback to computer 34 over a bus 61 so that the frame exposure time may be adjusted to optimize signal collection.

The servo control 136 issues commands to the stepping prism drive 106, azimuth drive (not shown) and the derotation drive 108, thereby controlling the operation of the stepping mechanism 100 (FIG. 5A).

Referring to FIG. 12, drive and control electronics 54 is shown in greater detail and illustrates the alternative embodiment in which master clock pulses are provided by computer 34, instead of from an external dock. For column groups C1–C16 of array 32, counters CN1–CN16 and corresponding clock drivers CD1–CD16 are provided. The outputs of counters CN1–CN16 are connected to the inputs of clock drivers CD1–CD16 by conductors CO1–CO16, respectively. Representative counter CN1 for column group C1 receives inputs over computer data bus 64, including pulses from a master clock located inside computer 34, a frame start/stop signal, and a pre-load signal representing a counter value which is related to the charge transfer rate for column group C1. When counter CN1 counts to the counter value, a trigger signal is sent by the counter to clock driver CD1 over conductor CO1. Clock driver CD1, in response to the trigger signal, transfers pixel information in all the columns in column group C1 by one row in array 32 by issuing voltage pulses over 3-phase output bus 68. This process of counting to a counter value and triggering a clock driver may repeat any number of times during the scene exposure depending on the rate of image motion in plane FP of array 32. The faster the rate of image motion in the plane of the array, the more times the counting and triggering cycle must be repeated in order to synchronize the image motion with the charge motion in the array 32.

Still referring to FIG. 12, signals from camera control computer 34 travel via data bus 64 to each of the counters CN1–CN16 for each of column groups C1–C16. Each of clock drivers CD1–CD16 provides one set of 3-phase clocking output lines $\emptyset_1$, $\emptyset_2$ and $\emptyset_3$ per column group. In FIG. 12, the subscript of a clocking output line identifies the corresponding column group within column groups C1–C16.

Figure 13:
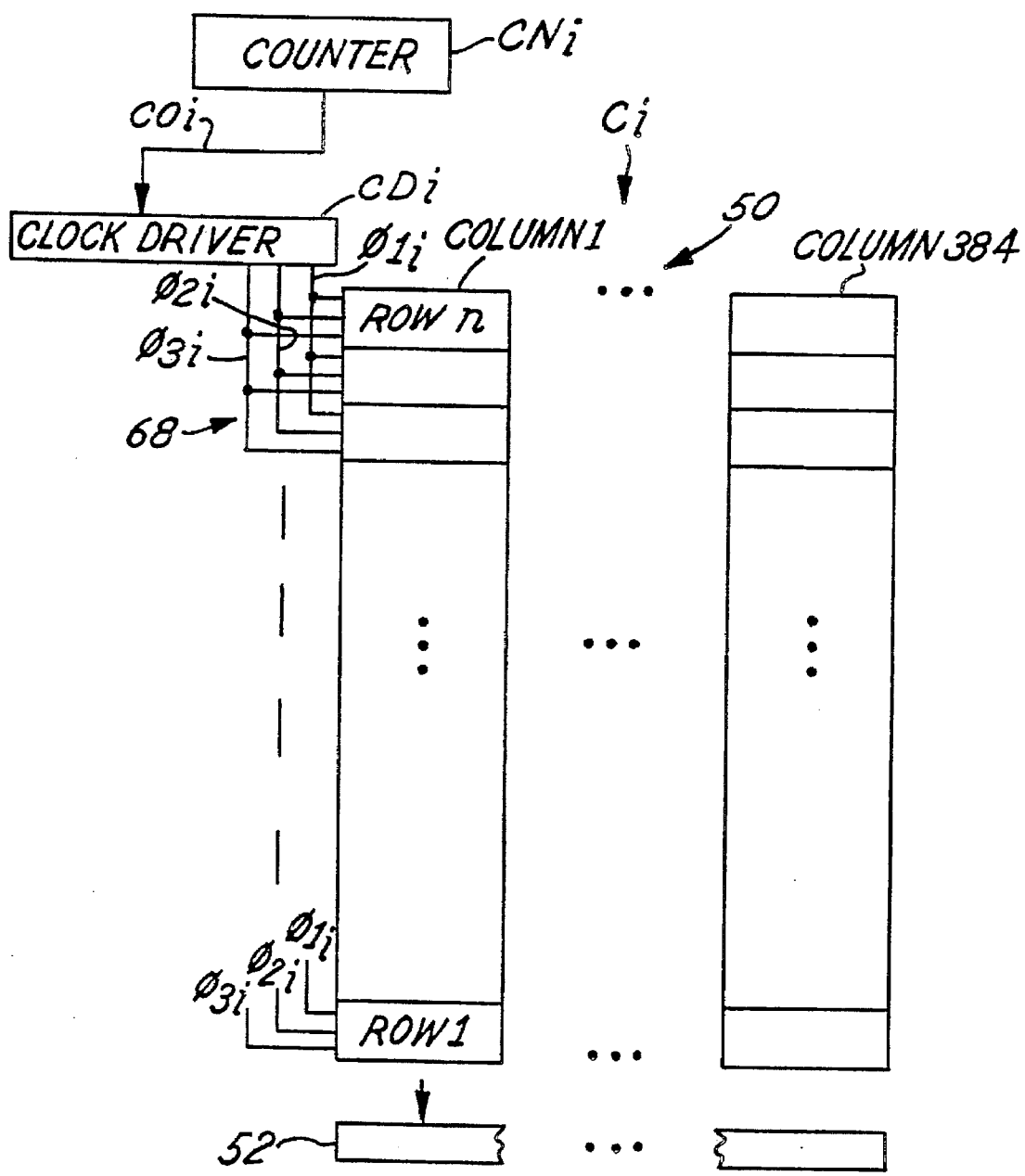
FIG. 13 is a schematic, block diagram of a counter and clock driver for an arbitrary column group of the imaging array of FIG. 10.

FIG. 13 shows a typical arbitrary column group Ci (50) and its associated counter CNi and dock driver CDi. For purposes of illustration, column group Ci is composed of 315 individual columns. In order to ensure that all array rows in a column group are transferred simultaneously when a related counter triggers a corresponding clock driver, the 3-phase clocking must be provided to all rows of the column group. This is shown symbolically by the 3-phase output lines 68 of clock driver CNi extending the length of column group Ci so that each row of column group Ci receives the 3-phase clocking pulses.

Assuming the clock drive circuits are not fabricated on the imaging array, 3-phase output bus lines 68 must be bonded to separate package pins for external drive control. Thus, the number of vertical clock drive pins for array 32 is three times the number of column groups.

FIG. 14 shows in enlarged detail one portion of an arbitrary column group Ci of imaging array 32. In particular, part of column group Ci is shown adjacent to the extreme lateral part of a neighboring column group Ci-1. Column group Ci is composed of 5,000 rows of photosites 85 and 315 columns designated CL1–CL315. Each photosite (shaded region) is bounded by a p+ channel stop 70, which separates each column from the next. Polysilicon horizontal lines 72 subdivide the photosite and bus the 3-phase clocking signals across the column group. The vertical clock drive pins 74, 76 and 78 are connected to metalization lines 80, 82 and 84, which run the entire length of the column group.

Metal to polysilicon contacts 86 on top of the channel stop regions 70 are provided periodically throughout the length of the column group for each metalization line to provide the voltage pulses for each row of the array. The 3-phase clocking signals (voltage pulses) may confine individual photosite charge vertically or may provide for the vertical transfer of these charge packets. Column groups Ci and Ci-1 are separated from each other by providing a break 88 in the polysilicon horizontal lines 72.

Figure 15:
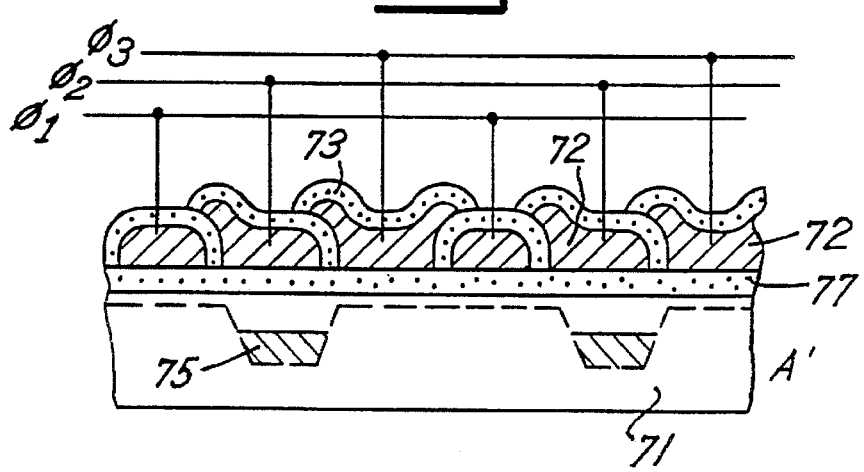
FIG. 15 is a cross-sectional view of one section of the column group along line A—A of FIG. 14.

FIG. 15 is a simplified cross-sectional view of the array of FIG. 14 along the line AA'. The polysilicon horizontal lines 72 are pulsed by the 3-phase clocks $\emptyset_1$, $\emptyset_2$, $\emptyset_3$, causing charge packets collected in potential wells 75 in a p-type silicon substrate 71 to be shifted down the array. In FIG. 15, the polysilicon horizontal lines 72 are isolated from each other by a $Si_2$ layer 73. Another $SiO_2$ layer 77 also separates the polysilicon horizontal lines 72 from substrate 71.

The charge-coupled device architecture shown in FIG. 14 is essentially a full frame imager configuration. The full frame configuration provides a large area array which provides a high percentage of silicon wafer area available for light collection. By contrast, a frame transfer architecture requires a frame storage region which occupies approximately the same amount of silicon wafer area as the imaging area. The interline transfer architecture does not provide the image resolution and small pixel pitch of the full frame design. The interline transfer architecture also requires a vertical transport register which adds non-sensitive spacing between adjacent pixels, reducing fill-factor and resolution. However, the interline transfer architecture may be preferred because its charge accumulation control design can eliminate the need for a physical shutter in the camera assembly, as the shutter can be simulated in the array itself. An X-Y addressable charge injection device is another possible architecture for the present invention. A discrete array of diode detector elements is also a possible architecture for the invention. Such an array or the above-mentioned architectures could operate in the ultraviolet, visible, or infrared spectral regions. The teachings disclosed herein can be readily adapted to these alternative architectures should they be preferred for other reasons, and the scope of the present invention is intended to cover these alternative architectures.

Example of Image Motion Compensation

Referring to FIGS. 4A–12, an example of the generation of a frame of imagery in a side-oblique mode is given below. It will be understood that the method described herein is typically performed for each frame of imagery in the stepping cycle as needed to account for varying rates of image motion across the array.

Pre-mission programmed information is supplied to camera control computer 34, and includes:

f=focal length of lens 40;

m=imaging array width perpendicular to the charge transfer direction (i.e., width W, FIG. 10);

N=number of array column groups;

$P_x$=pixel size, in the charge transfer direction (i.e., direction of the vertical arrows in FIG. 10);

X=master clock frequency;

FOV=field of view=2 arctan (m/2f)

$\emptyset_1 = \emptyset_n = (FOV/2)(N-1)/N$

During the stepping cycle, the computer 34 keeps track of which step the stepping mechanism 100 is in the stepping cycle, and hence the current camera depression angle δ. Also the avionics system 24 continuously provides to computer 34 the velocity and height data for the aircraft.

From these parameters, computer 34 calculates the charge transfer rate for the first column group ($r_1$) and the charge transfer rate for the Nth column group ($r_n$) according to:

$$r_1 = \frac{(f)(V)(\sin(\delta + \theta_1))}{(P_x)(H)\cos\theta_1} \quad (1)$$

$$r_n = \frac{(f)(V)(\sin(\delta + \theta_n))}{(P_x)(H)\cos\theta_n}$$

The "+" and "–" above will be opposite for $r_1$ and for $r_n$, and the choice of sign depends on the array orientation. The above equations hold for depression angles from 0° to 180°, where 0° to 90° would be arbitrarily defined as left oblique and 90° to 180° would be fight oblique.

To determine the charge transfer rates ($r_i$) for the column groups between 1 and N, a sinusoidal formula $$r_i = \frac{(f)(V)(\sin(\delta + \theta_i))}{(P_x)(H)\cos\theta_i}$$

could be used, with the values of Ø calculated to the center of each column group. However, in the preferred embodiment, a linear approximation formula is used which yields substantially the same results, with an error factor of about 0.01%. This linear approximation formula for the charge transfer rates for the $i^{th}$ column group is:

(2) $r_i = r_1 + (i-1)(r_n - r_1)/(N-1)$.

After calculating the charge transfer rates for each column group, the computer then calculates the pre-load counter value for each counter CN in drive and control electronics 54 (FIGS. 11 and 12). These counter values $CV_i$ for each counter (and for each column group) are:

$CV_i = X/r_i$ where X is the master clock frequency and $r_i$ is the charge transfer rate in the $i^{th}$ column group. The counters are then pre-loaded with the counter values over bus 64 (FIG. 11).

During the framing intervals, the shutter is simultaneously opened for an exposure time period calculated by computer 34. In this example, the exposure time period is 0.01 second. At the same time, each counter in drive and control electronics 54 begins counting at the frequency X to its pre-loaded counter value. The counting may be up to the counter value or down to 0 from the counter value. When the counter counts the predetermined number of counts, a trigger signal is sent from the counter to the clock drive CD for that counter, and one cycle of 3-phase clocking as triggered in the corresponding column group. Pixel information (electric charge packets) containing scene information is thereby shifted down one row vertically in all the columns in that column group.

After issuing a trigger pulse to the clock driver, the counter then automatically reloads and begins counting to the counter value again. When the counter value is reached again, the trigger pulse is sent, the clock driver shifts the pixel information one row vertically in all the columns in the column group, the counter reloads and the cycle is performed again. Meanwhile, the cycles are also being performed in the other column groups. Because each column group has a different charge transfer rate and corresponding counter value in order to match the charge transfer rate to the image motion rate, a principal object of the invention (i.e., electronic forward motion compensation without moving parts) is realized.

Although in the preferred embodiment the imaging array is divided into 16 column groups as a tradeoff between performance and cost, it may be desirable to use a 32 or higher column group regime. The more column groups there are, the less error (image smear) there is at the boundaries between adjacent column groups. However, with 32 column groups, there must be twice as many counters and clock drivers, as well as control lines, in the array. With fewer column groups, e.g., 8, the control circuitry is reduced proportionately, thus lowering cost, but image smear near the edges of the column groups may be unacceptable. The size of the array may be another factor when deciding how many column groups to use.

As an example of system operation, let V=480 knots, H=3000 ft., f=76.2 mm, N=16, δ=30° side oblique, and Ø=22° (field of view=44°). The integration time (exposure time period), which depends on the light level, is chosen to be 0.01 seconds. The pixel size is 0.01 mm.

First, the computer 34 calculates $r_1$ and $r_{16}$ according to equations (1). Then, from equation (2), the linear approximation formula is used to calculate the charge transfer rates for the remaining column groups. The charge transfer rates, $r_i$, are in units of pixels/integration time, or, in other words, rows of charge transfer per exposure time period. The results can be tabulated:

| Column Group | Charge Transfer Rate |
| --- | --- |
| $i$ | $r_i$ |
| C1 | 3.554 |
| | pixels/integration time (rows per exposure time period) |
| C2 | 4.452 |
| C3 | 5.349 |
| C4 | 6.247 |
| C5 | 7.145 |
| C6 | 8.043 |
| C7 | 8.940 |
| C8 | 9.838 |
| C9 | 10.736 |
| C10 | 11.634 |
| C11 | 12.531 |
| C12 | 13.429 |
| C13 | 14.327 |
| C14 | 15.225 |
| C15 | 16.122 |
| C16 | 17.020 |

Using column group 9 for illustration, during the exposure time period, the image moves 10.736 pixels down each of the columns in column group C9. Therefore, during the exposure time period, the charge packets in column group C9 representing scene information must be shifted vertically down the columns of the column group by 10.736 pixels. More precisely, the charge packets must be moved by one pixel in the vertical direction every 0.01/10.736 seconds.

To do this, counter CN9 for column group C9 is loaded with its particular counter value. If the master clock frequency is 10 MHz, or 100 ns/count, then the integration time of 0.01 seconds results in 100,000 master clock counts in the exposure time period. Thus, the counter value for column group C9 is 100,000/10.736, or 9,314. At the moment of opening the shutter, the counter, having been set to zero, begins to count at the master clock frequency up to 9,314. At count number 9,314 a match is obtained, and the clock driver CD9 (FIG. 12) is triggered. The charge packets in all the columns of column group C9 then are shifted by one row vertically. Counter CN9 is reset to zero and begins counting up to 9,314 again. Ten cycles of counting and triggering are obtained in 93,140 counts, and during the remainder of the integration time, no more clock cycles are triggered.

In the present example, note that if the exposure time period is reduced to 0.005 second, the image motion becomes 10.736/2 or 5.368 pixels during the integration time, and the total of master clock counts during exposure is halved as well to 50,000. However, the counter value remains the same. Thus, the exposure period is not critical to the implementation of the invention, and can be varied by the operator without affecting the forward motion compensation. The counter values $CV_i$ can be calculated in units of clock cycles per line as $X/r_i$ where X is in units of cycles per second and $r_i$ is in units of lines per second. The $r_i$ are derived as in equations (1) and (2), as before.

During the readout of the pixel information from the array 32, the stepping mechanism steps to the next depression angle, updated velocity, height, and camera depression angles are sent to the computer 34 and the computation of the charge transfer rates $r_1$ to $r_{16}$ for the 16 column groups of the array is repeated. This process is repeated as the camera steps through the cycle of steps. At the beginning of each new stepping cycle, the number of steps in the cycle, the beginning and ending camera depression angles are determined from the current velocity and height data (e.g., using the information in FIG. 16), together with any new camera operator input as to the overlap between successive images, or beginning and ending camera depression angles.

It will be apparent to those of skill in the art that various modifications can be made to the details of the preferred embodiment without departure from the true spirit and scope of the invention. The foregoing description of the preferred embodiment has assumed that the imaging array 32 is a single, monolithic detector. It is possible to make a detector that is equivalent to the imaging array disclosed herein by piecing together in mosaic fashion smaller individual area arrays to make one large array. The individual arrays (perhaps 4, 20 or even 100) are electronically combined and include a means for organizing the columns in all the individual arrays into one or more column groups and a means for transferring pixel information located in the one or more column groups at one or more predetermined transfer rates. One such array that could be used as an element of the "mosaic" is the Thomson CSF THX 31157 charge-coupled device. In the mosaic, each charge-coupled device could be separately controlled as an individual column group. In the appended claims, the term "array" is accordingly intended to include either a single, monolithic array or an array composed of individual arrays electronically, optically or physically combined together, or individual discrete detectors mounted in a hybrid mosaic array.

While the foregoing description of the preferred embodiment has set forth an exemplary method and apparatus for achieving motion compensation in an electro-optical imaging array, those of ordinary skill in the art will appreciate that many alternatives can be used without departing from the spirit and scope of the invention as defined in the appended claims. For example, digital electronic control circuits other than those disclosed can be used to control the charge transfer rates in the column groups of an imaging array. Moreover, analog circuits, delay circuits, or other types of control circuits may be devised to control the charge transfer rates to achieve forward motion compensation. In addition, many of the functions performed by the disclosed digital electronic control circuits can be implemented in software by computer 34 or another data processor. As previously noted, alternative architectures for an electro-optical imaging array may be chosen. The present invention, as defined in the appended claims, is intended to cover all such modifications and alternative implementations.

What is claimed is:

1. A method for imaging a scene with a framing camera comprising a two-dimensional array of photosensitive cells and a stepping mechanism, said array of cells storing pixel information and arranged in a plurality of rows and columns, said columns organized into a plurality of column groups including a first column group and a second column group, comprising, in combination, the sequence of operations of:

(a) directing with said stepping mechanism adjacent portions of an image of a scene upon said array, said operation of directing performed in a sequence of discrete preselected angular steps, each of said steps separated in time by a predetermined framing interval during which said photosensitive cells of said array are exposed to said image of said scene;

(b) during at least one of said predetermined framing intervals, transferring pixel information in said first column group of said array at a first transfer rate and simultaneously transferring pixel information in said second column group at a second transfer rate different from said first transfer rate, said transferring of pixel information compensating for different rates of image motion in said first and second column groups, respectively, to thereby prevent smearing of an image produced by said array;

(c) during a time period of each of said steps of said stepping mechanism, reading out said pixel information from said array of cells into a data storage or display device; and (d) repeating operations (a), (b) and (c) in a series of cycles, thereby generating a series of frames of images of said scene with said array of cells.

2. The method of claim 1, wherein said method is performed in an aircraft, and wherein said method further comprises adjusting said discrete steps of said stepping mechanism and adjusting the rate of transferring of pixel information in said first and second column groups as a velocity to height ratio of said aircraft varies as said aircraft flies past a terrain of interest.

3. The method of claim 1, wherein said array of cells is arranged in a plurality of column groups, and wherein, during said step of transferring pixel information, the pixel information transfer rate for said column groups varies monotonically across said column groups.

4. The method of claim 1, wherein said stepping mechanism comprises a stepping prism.

5. The method of claim 1, wherein said stepping mechanism comprises a mirror.

6. The method of claim 1, further comprising derotating an image produced by said stepping mechanism so as to eliminate rotational effects introduced into said image by said stepping operation.

7. The method of claim 6, wherein said operation of derotating comprises rotating said array of cells about an axis normal to a plane containing said array of cells.

8. The method of claim 6, wherein said step of derotating comprises the step of rotating a pechan prism about an axis normal to a plane containing said array of cells.

9. An electro-optical step-frame camera system with electronic image motion compensation, comprising, in combination:

(a) a framing camera comprising a two-dimensional array of photosensitive cells for storing pixel information arranged in rows and columns, said columns arranged in a plurality of column groups including a first column group and a second column group, said array further comprising (i) image motion compensation control means for transferring pixel information in said first column group at a first transfer rate and for transferring pixel information in said second column group at a second transfer rate different from said first transfer rate, said first and second transfer rates corresponding to a rate of image motion in said first and second column groups to thereby prevent smear of an image produced by said array; and (ii) means for reading out pixel information from said array of cells;

(b) a lens for focusing an image of a scene upon said array;

(c) stepping means for directing said image of said scene upon said lens and said array;

(d) means for derotating said image of said scene directed by said stepping means upon said array;

(e) drive means for rotating said stepping means in a series of successive cycles, each of said cycles comprising a sequence of discrete preselected angular steps, said sequence of steps directing successive scene images onto said array of cells, said sequence of steps separated in time by a predetermined framing interval during which said array is exposed to an image of said scene;

wherein said image motion compensation control circuitry is operative during said predetermined framing intervals to transfer pixel information within said first and second column groups at said first and second different transfer rates, respectively, to thereby prevent smearing of images produced by said array.

10. The camera system of claim 9, wherein said stepping means comprises a stepping prism.

11. The camera system of claim 9, wherein said stepping means comprises a mirror.

12. The camera system of claim 10 or claim 11, wherein said derotation means comprises a pechan prism.

13. The camera system of claim 9, wherein said derotation means further comprises a pechan prism and a derotation drive, wherein said derotation drive steps said pechan prism by one half the angular increment of said stepping means.

14. The camera system of claim 9, wherein said camera is installed in an aircraft, and wherein said camera system further comprises a camera control means for adjusting said discrete steps of said stepping mechanism and adjusting said transferring of pixel information in said first and second column groups as a velocity to height ratio of said aircraft varies as said aircraft flies past a terrain of interest.

15. The camera system of claim 9, wherein said derotation means further comprises a delta prism.

16. The camera system of claim 9, wherein said derotation means comprises a dove prism.

17. The camera system of claim 9, wherein said derotation means comprises a K-mirror.

18. The camera system of claim 9, wherein said camera system further comprises a drive motor for rotating said stepping means about an azimuth axis so as to correct for aircraft motion between frames.

19. The camera system of claim 9, wherein said readout means is operative to read out pixel information from said array during a time in which said drive means rotates said stepping means between said discrete angular steps.

20. The camera system of claim 19, wherein said readout means is operative during the period of time in which said stepping means retraces to an intial position to commence a cycle of said discrete angular steps.

21. The camera system of claim 19, wherein said array of cells comprises a charge-coupled device.

22. The method of claim 1, wherein said array of cells comprises a charge-coupled device.

* * * * *